US012704917B2

(12) United States Patent
Lee et al.

(10) Patent No.: US 12,704,917 B2
(45) Date of Patent: Aug. 11, 2026

(54) ELECTRONIC DEVICE AND OPERATING METHOD THEREOF

(71) Applicant: SAMSUNG ELECTRONICS CO., LTD., Suwon-si (KR)

(72) Inventors: Kisung Lee, Suwon-si (KR); Kibum Seong, Suwon-si (KR); Sangki Yoon, Suwon-si (KR); Yongseok Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/183,019

(22) Filed: Apr. 18, 2025

(65) Prior Publication Data

US 2025/0244841 A1 Jul. 31, 2025

Related U.S. Application Data

(63) Continuation of application No. PCT/KR2023/010598, filed on Jul. 21, 2023.

(30) Foreign Application Priority Data

Oct. 18, 2022 (KR) ........................ 10-2022-0134469
Jan. 25, 2023 (KR) ........................ 10-2023-0009258

(51) Int. Cl.
*G06F 3/038* (2013.01)
*G06F 3/0487* (2013.01)
*G06V 40/20* (2022.01)

(52) U.S. Cl.
CPC .......... *G06F 3/0383* (2013.01); *G06F 3/0487* (2013.01); *G06V 40/20* (2022.01);
(Continued)

(58) Field of Classification Search
CPC ................. G06F 3/0383; G06F 3/0487; G06F 2203/0384; G06F 2203/04803;
(Continued)

(56) References Cited

U.S. PATENT DOCUMENTS 5,687,408 A 11/1997 Park
7,874,917 B2 * 1/2011 Marks .................. G06F 3/0325 463/36

(Continued)

FOREIGN PATENT DOCUMENTS

CN 114691064 A 7/2022
JP 2001-94900 A 6/2001

(Continued)

OTHER PUBLICATIONS

International Search Report (PCT/ISA/210) dated Oct. 20, 2023 issued by the International Searching Authority in International Application No. PCT/KR2023/010598.

(Continued)

*Primary Examiner* — Dmitriy Bolotin
(74) *Attorney, Agent, or Firm* — Sughrue Mion, PLLC

(57) ABSTRACT

An electronic device includes a display; memory storing instructions; and one or more processors, wherein the instructions, when executed by the one or more processors, cause the electronic device to obtain items of content including first content and second content; identify a positional relationship between a first control device controlling the first content and a second control device controlling the second content; and arrange a first partial screen including the first content and a second partial screen including the second content such that the first partial screen and the second partial screen correspond to the positional relationship, and output, via the display, the items of content on the first partial screen and the second partial screen.

18 Claims, 17 Drawing Sheets

(52) U.S. Cl.
CPC ................ *G06F 2203/0384* (2013.01); *G06F 2203/04803* (2013.01)

(58) Field of Classification Search
CPC ...... G06F 3/0481; G06F 3/04842; G06F 3/00; G06F 3/01; G06F 3/14; G06V 40/20; H04N 21/431; H04N 21/422; G06Q 50/10; H04W 4/80
See application file for complete search history.

(56) References Cited

U.S. PATENT DOCUMENTS 8,323,106 B2 * 12/2012 Zalewski .............. A63F 13/215 463/31
8,350,805 B2 1/2013 Miyazaki et al.
8,427,426 B2 * 4/2013 Corson ................. G06F 3/0346 345/157
8,870,650 B2 10/2014 Ito et al.
9,046,927 B2 6/2015 Marks et al.
9,294,819 B2 3/2016 Lee et al.
10,150,028 B2 * 12/2018 Mikhailov ............ A63F 13/235
10,279,254 B2 * 5/2019 Mikhailov ............ A63F 13/428
11,065,532 B2 7/2021 Mikhailov et al.
2006/0277571 A1 * 12/2006 Marks ..................... F41A 33/02 725/37
2007/0021208 A1 * 1/2007 Mao ........................ G06F 3/038 463/36
2007/0060336 A1 * 3/2007 Marks ................. A63F 13/5372 463/30
2008/0261693 A1 * 10/2008 Zalewski .............. A63F 13/213 463/31
2013/0093670 A1 4/2013 Iwai
2013/0324243 A1 * 12/2013 Mikhailov ............ A63F 13/235 463/31
2016/0139797 A1 5/2016 Baek
2017/0239568 A1 * 8/2017 Shiraiwa ............. A63F 13/2145
2018/0036637 A1 2/2018 Shiraiwa et al.
2018/0229121 A1 * 8/2018 Tokuchi .................. A63F 13/52
2019/0215182 A1 * 7/2019 Lee ....................... H04W 4/025
2022/0070066 A1 * 3/2022 Tokuchi .............. H04L 12/1822
2023/0350629 A1 11/2023 Wang
2024/0152250 A1 * 5/2024 Hwang ............ H04N 21/44218

FOREIGN PATENT DOCUMENTS

JP 2007-275474 A 10/2007
JP 2012-507068 A 3/2012
JP 2012-161348 A 8/2012
JP 2013-115644 A 6/2013
JP 2017-148100 A 8/2017
KR 10-2013-0074034 A 4/2013
KR 10-2015-0024385 A 3/2015
KR 10-2016-0057651 A 5/2016
KR 10-2152595 B1 9/2020
KR 10-2415754 B1 7/2022
WO 2011155192 A1 12/2011

OTHER PUBLICATIONS

Written Opinion (PCT/ISA/237) dated Oct. 20, 2023 issued by the International Searching Authority in International Application No. PCT/KR2023/010598.

* cited by examiner

Figure 3:
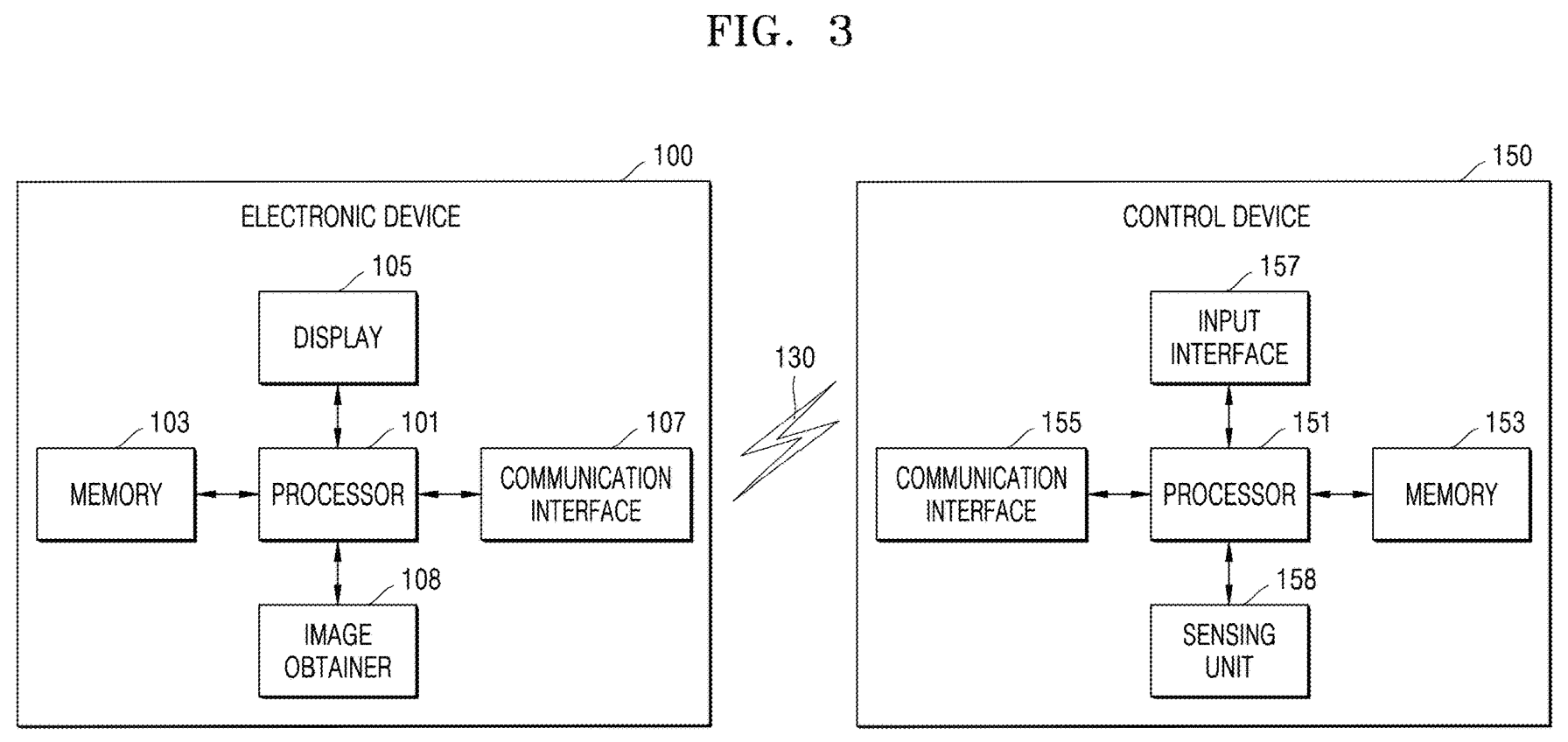

150
CONTROL DEVICE
157 INPUT INTERFACE
151 PROCESSOR
153 MEMORY
158 SENSING UNIT
155 COMMUNICATION INTERFACE

130

100
ELECTRONIC DEVICE
105 DISPLAY
101 PROCESSOR
107 COMMUNICATION INTERFACE
108 IMAGE OBTAINER
103 MEMORY

FIG. 6

ELECTRONIC DEVICE AND OPERATING METHOD THEREOF

CROSS-REFERENCE TO RELATED APPLICATIONS

This application is a by-pass continuation application of International Application No. PCT/KR2023/010598, filed on Jul. 21, 2023, which is based on and claims priority to Korean Patent Application No. 10-2022-0134469, filed on Oct. 18, 2022, and Korean Patent Application No. 10-2023-0009258, filed on Jan. 25, 2023, in the Korean Intellectual Property Office, the disclosures of which are incorporated by reference herein in their entireties.

BACKGROUND

1. Field

The disclosure relates to an electronic device and an operation method of the electronic device, and more particularly, to an electronic device for providing highly visible content to users, and an operation method of the electronic device.

2. Description of Related Art

Electronic devices are able to output various items of content. For example, electronic devices can output game content, such as metaverse content. Users can use game content by using a control device 150, such as a remote controller.

A plurality of users can enjoy game content together by using electronic devices. For example, a plurality of users can enjoy game content by controlling individual items of content output through screens of electronic devices by using separate control devices. To increase user visibility, electronic devices need to be capable of outputting content by taking into account, for example, respective locations of a plurality of users and/or a virtual space of each metaverse content.

SUMMARY

According to an aspect of the disclosure, an electronic device includes a display; memory storing instructions; and one or more processors, wherein the instructions, when executed by the one or more processors, cause the electronic device to obtain a plurality of items of content including first content and second content; identify a positional relationship between a first control device controlling the first content and a second control device controlling the second content; and arrange a first partial screen including the first content and a second partial screen including the second content such that the first partial screen and the second partial screen correspond to the positional relationship, and output, via the display, the plurality of items of content on the first partial screen and the second partial screen.

The instructions, when executed by the one or more processors, may cause the electronic device to obtain an image of the first control device and the second control device; identify, from the image, a first identification signal output by the first control device and a second identification signal output by the second control device; and identify the positional relationship based on the first identification signal and the second identification signal.

The instructions, when executed by the one or more processors, may cause the electronic device to transmit, to the first control device, a first output request signal for requesting the first control device to output the first identification signal; and transmit, to the second control device, a second output request signal for requesting the second control device to output the second identification signal.

The first identification signal and the second identification signal may be different from each other in terms of at least one of an LED color and an LED blinking time interval.

The instructions, when executed by the one or more processors, may cause the electronic device to identify a change in the positional relationship between the first control device and the second control device; and re-arrange the first partial screen and the second partial screen to correspond to the changed positional relationship, and display the plurality of items of content on the re-arranged first partial screen and the re-arranged second partial screen.

The instructions, when executed by the one or more processors, may cause the electronic device to identify degrees of usage of a plurality of control devices including the first control device and the second control device; and adjust, according to the degrees of usage, at least one of a size or a location of at least one of the first partial screen and the second partial screen.

The instructions, when executed by the one or more processors, may cause the electronic device to identify the degrees of usage based on at least one of a plurality of frequencies at which control signals for content control are input from the plurality of control devices, a plurality of sensing signals for control device movement received from the plurality of control devices, a change degree of at least one of an avatar or a background included in content, and a distance between a user and a control device, wherein the distance is detected from the image.

The electronic device may further include a communication interface, and the instructions, when executed by the one or more processors, may cause the electronic device to receive the plurality of items of content from a server via the communication interface; and based on receiving, from the server, single integrated content in which the first content and the second content are integrated, output, via the display, one screen including the integrated content.

The instructions, when executed by the one or more processors, may cause the electronic device to receive an transmission inquiry signal from the server for the integrated content; based on receiving the transmission inquiry signal, output, via the display, an interface screen for choosing whether to display the integrated content; and transmit a transmission request signal to the server, based on receiving a third output request signal corresponding to a selection from the interface screen.

According to an aspect of the disclosure, a server for providing content to an electronic device includes a communication interface; memory storing instructions; and one or more processors, wherein the instructions, when executed by the one or more processors, cause the server to transmit a plurality of items of content including first content and second content, to the electronic device, via the communication interface; and generate integrated content corresponding to a distance between a virtual space of the first content and a virtual space of the second content being less than or equal to a threshold, and transmit the integrated content to the electronic device, via the communication interface.

According to an aspect of the disclosure, an operation method of an electronic device includes obtaining a plurality of items of content including first content and second content; identifying a positional relationship between a first control device controlling the first content and a second control device controlling the second content; and arranging a first partial screen including the first content and a second partial screen including the second content such that the first partial screen and the second partial screen correspond to the positional relationship, and output, via a display, the plurality of items of content on the first partial screen and the second partial screen.

The identifying the positional relationship may include obtaining an image of the first control device and the second control device; identifying, from the image, a first identification signal output by the first control device and a second identification signal output by the second control device; and identifying the positional relationship based on the first identification signal and the second identification signal.

The operation method may further include transmitting, to the first control device, a first output request signal for requesting to output a first identification signal; and transmitting, to the second control device, a second output request signal for requesting to output the second identification signal.

The first identification signal and the second identification signal may be different from each other in terms of at least one of an LED color and an LED blinking time interval.

The operation method may further include identifying a change in the positional relationship between the first control device and the second control device; and re-arranging the first partial screen and the second partial screen to correspond to the changed positional relationship, and displaying the plurality of items of content on the re-arranged first partial screen and the re-arranged second partial screen.

BRIEF DESCRIPTION OF DRAWINGS

The above and other aspects, features, and advantages of certain embodiments of the present disclosure are more apparent from the following description taken in conjunction with the accompanying drawings, in which:

FIG. 2 is a block diagram of an electronic device according to an embodiment;

FIG. 3 is a block diagram of an electronic device and a control device according to an embodiment;

FIG. 6 is a diagram illustrating an electronic device outputting a plurality of items of content, according to an embodiment;

DETAILED DESCRIPTION

Figure 1:
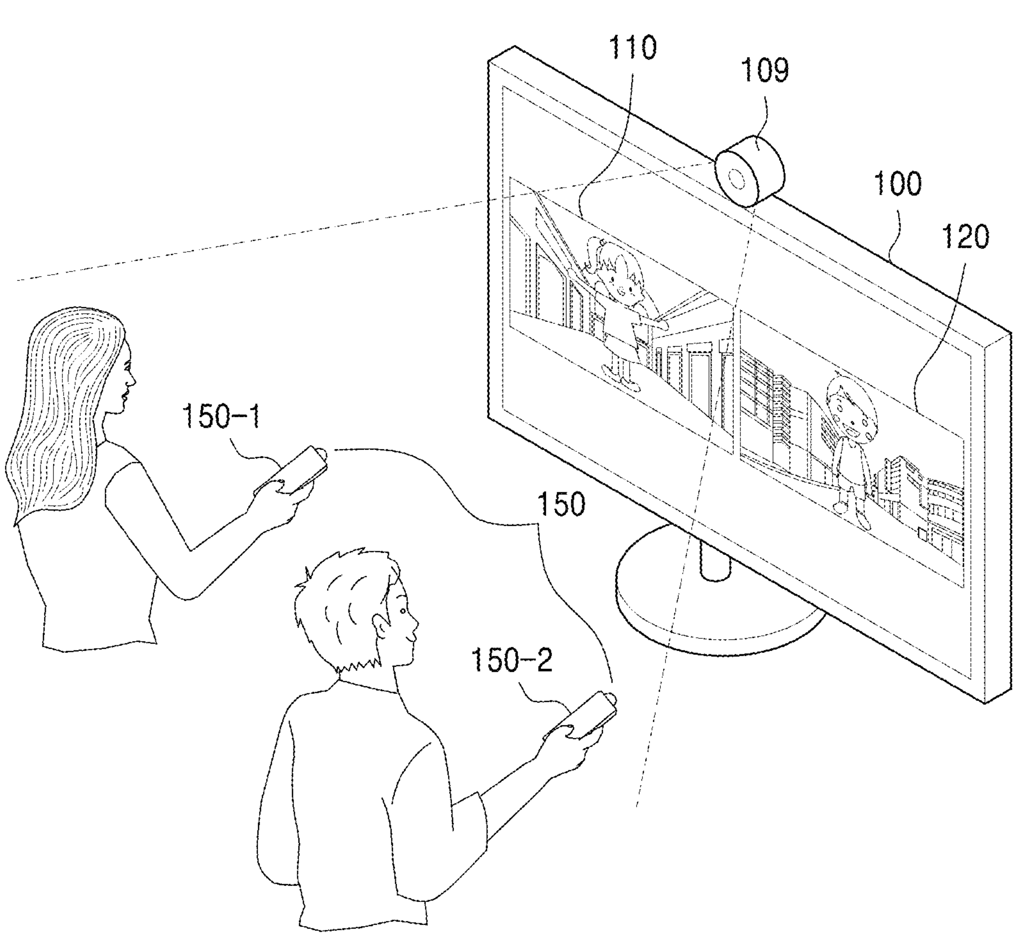
FIG. 1 is a diagram illustrating an electronic device outputting a plurality of items of content, based on a positional relationship between a plurality of control devices, according to an embodiment.

The embodiments described and the configurations shown in the drawings, are only examples of embodiments, and various modifications may be made without departing from the scope and spirit of the disclosure.

A server for providing content to an electronic device, according to an embodiment, may include a communication interface, a memory storing one or more instructions, and one or more processors configured to execute the one or more instructions stored in the memory.

According to an embodiment, the one or more processors may transmit a plurality of items of content including first content and second content through the communication interface by executing the one or more instructions.

According to an embodiment, the one or more processors may generate integrated content in correspondence with a distance between a virtual space of the first content and a virtual space of the second content being less than or equal to a threshold, and transmit the integrated content to the electronic device, by executing the one or more instructions.

An operation method of an electronic device according to an embodiment may include obtaining a plurality of items of content including first content and second content.

According to an embodiment, the operation method of an electronic device may include outputting the first content through a first partial screen and the second content through a second partial screen, According to an embodiment, the operation method of an electronic device may include identifying a positional relationship between a first control device controlling the first content and a second control device controlling the second content.

According to an embodiment, the operation method of an electronic device may include arranging the first partial screen and the second partial screen to correspond to the positional relationship, and outputting the plurality of items of content on the arranged first partial screen and the arranged second partial screen.

A recording medium according to an embodiment may be a computer-readable recording medium having recorded thereon a computer program for executing an operation method of an electronic device, the operation method including obtaining a plurality of items of content including first content and second content.

According to an embodiment, the recording medium may be a computer-readable recording medium having recorded thereon a computer program for executing an operation method of an electronic device, the operation method including outputting the first content through a first partial screen and the second content through a second partial screen.

According to an embodiment, the recording medium may be a computer-readable recording medium having recorded thereon a computer program for executing an operation method of an electronic device, the operation method including identifying a positional relationship between a first control device controlling the first content and a second control device controlling the second content.

According to an embodiment, the recording medium may be a computer-readable recording medium having recorded thereon a computer program for executing an operation method of an electronic device, the operation method including arranging the first partial screen and the second partial screen to correspond to the positional relationship, and outputting the plurality of items of content on the arranged first partial screen and the arranged second partial screen.

Throughout the present disclosure, the expression "at least one of a, b or c" indicates only a, only b, only c, both a and b, both a and c, both b and c, all of a, b, or c.

Embodiments of the present disclosure are described in detail herein with reference to the accompanying drawings so that the present disclosure may be performed by one of ordinary skill in the art to which the present disclosure pertains. The present disclosure may be embodied in different forms and should not be construed as being limited to the examples set forth herein.

Although terms widely used at present were selected for describing the disclosure in consideration of the functions thereof, these terms may vary according to intentions of one of ordinary skill in the art, case precedents, the advent of new technologies, or the like. Hence, the terms must be defined based on their meanings and the contents of the entire disclosure, not by simply stating the terms.

The terms used in the present disclosure are used to describe particular embodiments, and are not intended to limit the scope of the present disclosure.

Throughout the disclosure, when an element is referred to as being "connected" or "coupled" to another element, it can be directly connected or coupled to the other element, or can be electrically connected or coupled to the other element with intervening elements interposed therebetween.

The use of the terms "the" and similar referents are to be construed to cover both the singular and the plural. The steps of all methods described herein can be performed in any order unless otherwise indicated herein or otherwise clearly contradicted by context. Embodiments of the disclosure are not limited to the described order of the operations. The expression, "according to an embodiment," used in the disclosure does not necessarily indicate the same embodiment.

Embodiments of the disclosure may be described in terms of functional block components and various processing steps. Some or all of these functional blocks may be implemented using various numbers of hardware and/or software configurations that perform functions. For example, the functional blocks of the disclosure may be implemented by one or more microprocessors, or by circuit configurations for a certain function. For example, the functional blocks of the disclosure may be implemented in various programming or scripting languages. The functional blocks may be implemented as algorithms executed in one or more processors. The disclosure may employ the art for electronic configuration, signal processing, and/or data processing, for example. Terms such as "mechanism", "element", "means", and "configuration" may be used broadly and are not limited to mechanical and physical configurations.

The connecting lines or connectors between components shown in the various figures presented are intended to represent exemplary functional relationships and/or physical or logical couplings between the components. In an actual device, a connection between components may be represented by various functional connections, physical connections, or circuit connections that are replaceable or added.

The terms "unit", "-er (-or)", and "module" when used in the disclosure refers to a unit in which at least one function or operation is performed, and may be implemented as hardware, software, or a combination of hardware and software.

The term "user" when used in the disclosure refers to a person who uses an electronic device, and may include a consumer, an evaluator, a viewer, an administrator, or an installation engineer.

Embodiments of the present disclosure will now be described more fully with reference to the accompanying drawings.

FIG. 1 is a diagram illustrating an electronic device 100 outputting a plurality of items of content, based on a positional relationship between a plurality of control devices 150, according to an embodiment.

Referring to FIG. 1, the electronic device 100 may be an image display device capable of outputting an image. According to an example, the electronic device 100 may be implemented as any of various types of electronic devices including displays. The electronic device 100 may be fixed or movable.

According to an embodiment, the electronic device 100 may include at least one of a desktop personal computer (PC), a smartphone, a tablet PC, a mobile phone, a video phone, an e-book reader, a laptop PC, a netbook computer, a digital camera, a personal digital assistant (PDA), a portable multimedia player (PMP), a camcorder, a navigation wearable device, a smart watch, a home network system, a security system, and a medical device.

The electronic device 100 may be implemented as not only a flat display apparatus but also a curved display apparatus having a curvature or a flexible display apparatus having an adjustable curvature. An output resolution of the electronic device 100 may have any of various resolutions such as a high definition (HD), a full HD, an ultra HD, or a resolution that is clearer than an ultra HD.

The electronic device 100 may output various types of content provided by content providers. The content may include video, audio, subtitles, and other additional information, such as still images or videos. The content provider may refer to a terrestrial broadcaster, cable broadcaster, satellite broadcaster, Internet Protocol Television (IPTV) service provider, Over the Top (OTT) service provider, or server operator that provides various types of content to consumers.

According to an embodiment, the content provider may include a game content provider that provides game content. According to an embodiment, the game content may include metaverse content. Metaverse may refer to a three-dimensional (3D) space platform enabling social, economic, educational, cultural, and scientific and technological activities like in real life to be conducted through avatars. The metaverse content may be content representing a virtual space provided by the metaverse platform.

According to an embodiment, the electronic device 100 may receive and output various items of content generated by a content provider through an external apparatus. For example, the external apparatus may be implemented as various types of source devices, such as a PC, a set-top box, a Blu-ray Disc player, a mobile phone, a game console, a home theater, an audio player, and a USB.

According to an embodiment, the electronic device 100 may receive metaverse content from a game console from among external apparatuses and output the metaverse content. The game console may receive game content from a game server through a network and transmit the game content to the electronic device 100.

According to an embodiment, the electronic device 100 may be a smart TV. The smart TV may refer to a digital TV equipped with an operating system (OS) and an Internet access function. The smart TV may also be called an Internet TV, a connected TV, or a hybrid TV.

According to an embodiment, the electronic device 100 may stream and output content created by an OTT service provider or game content created by a game content provider, by using a built-in OS.

According to an embodiment, the electronic device 100 may execute various types of applications. The electronic device 100 may have various types of apps (applications) installed by default. The electronic device 100 may, under a user's control, access the Internet to search for an app requested by the user, and may install the app.

The electronic device 100 may provide various services by executing the app. According to an embodiment, the electronic device 100 may receive game content from a server by executing a game app for providing metaverse content, and may output the game content. The server may be a game server that provides metaverse content.

The electronic device 100 may be controlled by the control device 150. The control device 150 may be an apparatus used to control the electronic device 100, such as a remote controller.

According to an embodiment, the user may control the metaverse content received from the game console or from the server by using the control device 150.

For convenience of explanation, a description will now be based on a case where the electronic device 100 directly receives the metaverse content from the server. However, embodiments are not limited thereto, and contents to be described below are equally applicable even to when the electronic device 100 receives the metaverse content from the server through the game console.

In the metaverse content, avatars manipulable by users appear. According to an embodiment, the user may control an avatar appearing in the metaverse content by using the control device 150. The user may use the control device 150 to cause the avatar to interact with other avatars, explore its surroundings, or perform actions appropriate to various situations.

In some cases, a plurality of users, rather than one user, may want to use metaverse content by using one electronic device 100. For example, when there are a plurality of control devices 150 capable of transmitting control signals to the electronic device 100 and the plurality of users want to use the metaverse content by using the control devices 150, respectively, the user may input that the number of players playing a game on the electronic device 100 is a plurality.

According to an embodiment, the electronic device 100 may transmit the number of users, for example, the number of players, to the server providing the metaverse content by executing an app.

According to an embodiment, the server may transmit a plurality of items of content, the number of which corresponds to the number of players, to the electronic device 100.

According to an embodiment, the electronic device 100 may receive metaverse content in which avatars appear, the number of which is equal to the number of players, and may output the metaverse content through the electronic device 100.

FIG. 1 illustrates a case in which two users use metaverse content by using one electronic device 100, according to an embodiment.

Referring to FIG. 1, according to an embodiment, the electronic device 100 may receive control signals from a plurality of control devices 150. According to an embodiment, the plurality of control devices 150 may include a first control device 150-1 and a second control device 150-2.

According to an embodiment, the electronic device 100 may obtain a plurality of items of metaverse content from a server that provides game content. According to an embodiment, the plurality of items of metaverse content may include first content and second content. According to an embodiment, the first content and the second content may be items of content controlled by the first control device 150-1 and the second control device 150-2, respectively.

According to an embodiment, the electronic device 100 may output the plurality of items of metaverse content as multiple views through a partial screen.

According to an embodiment, the electronic device 100 may output content in a single-view mode or in a multi-view mode. The single-view mode may refer to a mode in which the electronic device 100 displays one item of content on one single screen. The multi-view mode may refer to a mode in which the electronic device 100 splits the screen into a plurality of areas and displays different items of content on the plurality of areas. In the multi-view mode, each of the plurality of areas may be referred to as a sub-screen or a partial screen.

A plurality of partial screens provided in the multi-view mode may be determined as any of various numbers according to the number of users, for example, the number of players. For example, when there are two, three, or four or more players, the number of partial screens provided in the multi-view mode may also be two, three, or four or more.

FIG. 1 illustrates two partial screens. Referring to FIG. 1, in the multi-view mode, the electronic device 100 may output different items of content through a first partial screen 110 and a second partial screen 120, respectively. For example, the electronic device 100 may output the first content through the first partial screen 110 and the second content through the second partial screen 120 in the multi-view mode.

When the electronic device 100 outputs a plurality of items of content through a plurality of partial screens and a location where content is output does not match a user's location, the user may feel uncomfortable.

According to an embodiment, when the electronic device 100 outputs the plurality of partial screens in the multi-view mode, the electronic device 100 may enable a location of the control device 150 to correspond to a location of a partial screen on which content is output, which is controlled by the control device 150.

According to an embodiment, the electronic device 100 may identify a positional relationship between the first control device 150-1 controlling the first content and the second control device 150-2 controlling the second content.

According to an embodiment, the electronic device 100 may transmit an identification signal output request signal to the plurality of control devices 150. According to an embodiment, the identification signal output request signal is a signal requesting the control device 150 to output an identification signal, and may include the identification signal and information requesting output of the identification signal.

According to an embodiment, the identification signal, which is a signal output by the control device 150, may be used to identify the control device 150.

According to an embodiment, the control device 150 may include an LED. The LED included in the control device 150 may be an infrared (IR) LED. According to an embodiment, the control device 150 may emit IR rays to the electronic device 100 by using the LED as a transmitter. According to an embodiment, the electronic device 100 may identify the control device 150 by using a color of the IR rays emitted by the LED included in the control device 150 and/or an on/off pattern of the IR rays as the identification signal. A period or time interval at which the LED blinks may be determined according to a pattern of the IR rays.

According to an embodiment, the electronic device 100 may transmit an identification signal output request signal to each of the plurality of control devices 150 requesting them to output different identification signals. According to an embodiment, the electronic device 100 may transmit, to the first control device 150-1, a first output request signal for requesting to output a first identification signal. According to an embodiment, the electronic device 100 may transmit, to the second control device 150-2, a second output request signal for requesting to output a second identification signal.

According to an embodiment, the first control device 150-1 may receive the first output request signal from the electronic device 100, and thus may output the first identification signal. According to an embodiment, the second control device 150-2 may receive the second output request signal from the electronic device 100, and thus may output the second identification signal.

According to an embodiment, the first identification signal and the second identification signal may be signals that are different from each other in terms of at least one of an LED color and an LED blinking time interval. The LED blinking time interval may vary according to a pattern in which an LED infrared lamp blinks.

According to an embodiment, the electronic device 100 may include an image obtainer. According to an embodiment, the image obtainer may include a camera 109. According to an embodiment, one or more cameras 109 may be placed at various locations, such as a top, bottom, and side of the front of the electronic device 100.

According to an embodiment, the electronic device 100 may obtain an image by photographing the first control device 150-1 and the second control device 150-2 and a plurality of users using the first control device 150-1 and the second control device 150-2 by using the camera 109.

According to an embodiment, the electronic device 100 may identify an LED signal output by at least one of the first control device 150-1 and the second control device 150-2, from an image obtained by photographing the control device 150 and the plurality of users. According to an embodiment, the electronic device 100 may identify at least one of a color of LED light and an LED blinking time interval from the image.

According to an embodiment, the electronic device 100 may identify the LED signal identified from the image as the identification signal. According to an embodiment, the electronic device 100 may identify the control device 150 by comparing the color or blinking time interval of the LED light included in the image with the identification signal included in the identification signal output request signal transmitted to each of the plurality of control devices 150.

According to an embodiment, the electronic device 100 may identify the first identification signal from the image, and may identify that the control device 150 transmitting the first identification signal is the first control device 150-1. According to an embodiment, the electronic device 100 may identify the second identification signal from the image, and may identify that the control device 150 transmitting the second identification signal is the second control device 150-2.

According to an embodiment, the electronic device 100 may identify the positional relationship between the first control device 150-1 and the second control device 150-2, based on the first identification signal and the second identification signal.

According to an embodiment, the electronic device 100 may arrange the first partial screen 110 outputting the first content and the second partial screen 120 outputting the second content, to correspond to a positional relationship between a plurality of control devices 150.

Referring to FIG. 1, it may be seen that the electronic device 100 arranges the first partial screen 110 on the left portion of the screen and the second partial screen 120 on the right portion of the screen, based on a direction in which the electronic device 100 is viewed. The electronic device 100 may cause the first content controlled by the first control device 150-1 to be output on the left side of the screen, and the second content controlled by the second control device 150-2 to be output on the right side of the screen. The plurality of users are able to use content output at screen locations corresponding to a positional relationship therebetween, and thus may immerse themselves in a game more naturally.

According to an embodiment, the positional relationship between the plurality of users may be changed. For example, the positional relationship between the plurality of users may change, like in a case where one of the plurality of users is on the left of another user and then moves to the right of the other user.

According to an embodiment, the electronic device 100 may obtain an image by continuously photographing the first control device 150-1, the second control device 150-2, and the plurality of users by using the camera 109, and may identify a positional relationship between the plurality of control devices 150, based on locations of the first identification signal and the second identification signal identified from the image.

According to an embodiment, the electronic device 100 may identify that the respective locations of the first control device 150-1 and the second control device 150-2 have been changed, based on the change in the locations of the first identification signal and the second identification signal.

According to an embodiment, the electronic device 100 may also re-arrange the respective locations of the first partial screen 110 outputting the first content and the second partial screen 120 outputting the second content, to correspond to a changed positional relationship between the first control device 150-1 and the second control device 150-2, in correspondence with the change in the respective locations of the first control device 150-1 and the second control device 150-2.

According to an embodiment, the electronic device 100 may identify degrees of usage of the plurality of control devices 150. According to an embodiment, the degrees of usage of the plurality of control devices 150 may indicate the amounts or frequencies of usage of the plurality of control devices 150 by a user.

According to an embodiment, the electronic device 100 may identify the degrees of usage of the plurality of control devices 150 according to various methods.

For example, based on a frequency with which a control signal for content control is received from each of the plurality of control devices 150, the electronic device 100 may identify the degrees of usage of the plurality of control devices 150.

For example, based on a sensing signal with respect to a movement of each of the plurality of control devices 150, received from each of the plurality of control devices 150, the electronic device 100 may identify the degrees of usage of the plurality of control devices 150.

For example, the electronic device 100 may identify a degree of usage of a control device 150, based on a degree of change in at least one of an avatar and a background included in content. According to an embodiment, the electronic device 100 may capture the screen at regular intervals, identify content displayed on the screens, and identify the degree of usage of the control device 150, based on whether the avatars and/or background screens included in the content are identical to each other.

For example, the electronic device 100 may identify the usage degree of the plurality of control devices 150 based on the distance detected between the user and the control devices 150 from the images obtained by photographing the plurality of control devices 150. According to an embodiment, the electronic device 100 may identify a human figure from the image by using an image detection technique. The electronic device 100 may also identify an identification signal's location from the image. According to an embodiment, based on a positional relationship between the human figure and the identification signal identified from the image, the electronic device 100 may identify that the control device 150 is not used, when a distance between the human figure and the identification signal is equal to or greater than a certain threshold.

The above description is an example of an embodiment, and a method in which the electronic device 100 identifies the degree of usage of the control device 150 may be implemented in various other forms.

According to an embodiment, the electronic device 100 may adjust at least one of the size and location of at least one of the first partial screen 110 and the second partial screen 120 according to the degrees of usage of the plurality of control devices 150.

According to an embodiment, for a control device 150 whose usage degree is lower than a reference value, the electronic device 100 may adjust a size of a partial screen to which content controlled by the control device 150 is output to be smaller than the original size.

According to an embodiment, for a control device 150 whose usage degree is lower than a reference value, the electronic device 100 may adjust the partial screen to which content controlled by the control device 150 is output to be positioned at a more outer location on the screen than the original location.

According to an embodiment, in accordance with the adjustment of the size and/or location of the partial screen on which the content controlled by the control device 150 with a low usage degree, the electronic device 100 may adjust the size of a partial screen on which content controlled by a remaining control device 150 with a usage degree not lower than the reference value is output to be larger than the original size and/or adjust the location of the partial screen to move toward the center of the screen.

According to an embodiment, the electronic device 100 may output the first content and the second content through the first partial screen 110 and the second partial screen 120, respectively, based on reception of the first content and the second content from a server.

According to an embodiment, the electronic device 100 may receive a single integrated content in which the first content and the second content are integrated, rather than receiving the first content and the second content as separate individual contents from the server.

According to an embodiment, the integrated content may refer to content that includes a plurality of avatars appearing together in a plurality of items of content. For example, the integrated content in which the first content and the second content are integrated may be virtual metaverse content that includes both a first avatar appearing in the first content and a second avatar appearing in the second content. Content featuring one avatar controllable by one control device 150, such as the first content or the second content, may be referred to as individual content to be distinguished from the integrated content.

According to an embodiment, the server may generate the integrated content in correspondence with a distance between a virtual space of the first content and a virtual space of the second content being less than or equal to the threshold value, and may transmit the integrated content to the electronic device 100.

According to an embodiment, the electronic device 100 may output the integrated content through a screen in which the first partial screen 110 and the second partial screen 120 are integrated, based on the single integrated content being from the server. The electronic device 100 may increase the size of an integrated screen to a maximum size that may be output on the screen, and may output the integrated content through the integrated screen.

According to an embodiment, the electronic device 100 may receive a transmission inquiry signal for integrated content from the server before receiving the single integrated content from the server.

According to an embodiment, the electronic device 100 may output an interface screen regarding whether to output the integrated content, based on the transmission inquiry signal being received from the server. According to an embodiment, the electronic device 100 may receive the integrated content output request signal from the user in correspondence with the output of the interface screen. According to an embodiment, the electronic device 100 may transmit a transmission request signal to the server for integrated content, based on the integrated content output request signal being received.

According to an embodiment, the server may transmit the integrated content to the electronic device 100, based on the integrated content output request signal being received from the electronic device 100.

As such, according to an embodiment, in an environment where the plurality of users use metaverse content by using the plurality of control devices 150, the electronic device 100 may enable the positional relationship between the plurality of control devices 150 to correspond to a positional relationship between partial screens to which the plurality of items of content are output. A user is able to use the metaverse content displayed through a screen corresponding to the user's location, and thus may enjoy the metaverse content more naturally and conveniently.

According to an embodiment, the electronic device 100 may adjust the size and/or location of the partial screen where content is output, according to the degrees of usage of the plurality of control devices 150, thereby allowing a user using an actual control device 150 to enjoy content through a larger screen.

According to an embodiment, the electronic device 100 may receive the integrated content, rather than the individual items of content, from the server according to an environment on a virtual space, and output the integrated content through an integrated screen in which partial screens are combined, thereby providing an experience such as a plurality of users enjoying a game together in a virtual space.

Figure 2:
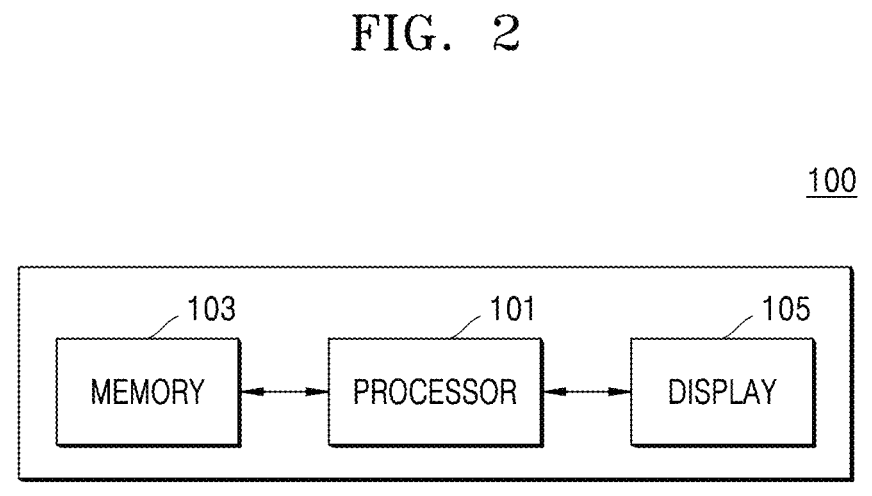

FIG. 2 is a block diagram of the electronic device 100 according to an embodiment.

Referring to FIG. 2, the electronic device 100 may include a processor 101, a memory 103, and a display 105.

The memory 103 according to an embodiment may store at least one instruction. The memory 103 may store at least one program that the processor 101 executes. The memory 103 may store data that is input to the electronic device 100 or output by the electronic device 100.

The memory 103 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

According to an embodiment, the memory 103 may store one or more instructions for obtaining a plurality of items of content including first content and second content.

According to an embodiment, the memory 103 may store one or more instructions for receiving a plurality of items of content from a server.

According to an embodiment, the memory 103 may store one or more instructions for outputting each of the plurality of items of content in a multi-view mode through a partial screen, based on the plurality of items of content being received from the server.

According to an embodiment, the memory 103 may store one or more instructions for identifying a positional relationship between the plurality of control devices 150. According to an embodiment, the plurality of control devices 150 may include the first control device 150-1 and the second control device 150-2.

According to an embodiment, the memory 103 may store one or more instructions for arranging the first partial screen 110 outputting the first content and the second partial screen 120 outputting the second content, to correspond to the positional relationship between the plurality of control devices 150.

According to an embodiment, the memory 103 may store one or more instructions for transmitting an identification signal output request signal to the plurality of control devices 150.

According to an embodiment, the memory 103 may store one or more instructions for transmitting an identification signal output request signal to the plurality of control devices 150 at preset intervals, at random intervals, and/or whenever an event occurs.

According to an embodiment, the occurrence of an event may include a case where a degree of movement of a user's figure identified from an image obtained by photographing the plurality of control devices 150 and the user is greater than a threshold value.

According to an embodiment, an identification signal may include at least one of information about an LED color and information about an LED blinking time interval. According to an embodiment, the memory 103 may map an identifier of each of the plurality of control devices 150 with an identification signal transmitted to each of the plurality of control devices 150, and may store a result of the mapping. For example, the memory 103 may map an identifier of the first control device 150-1 with information about the LED color and/or LED blinking time interval of the first identification signal transmitted to the first control device 150-1, and may store a result of the mapping. The memory 103 may also map an identifier of the second control device 150-2 with information about the LED color and/or LED blinking time interval of the second identification signal transmitted to the second control device 150-2, and may store a result of the mapping.

According to an embodiment, the memory 103 may store one or more instructions for transmitting, to the first control device 150-1, a first output request signal for requesting to output the first identification signal, and transmitting, to the second control device 150-2, a second output request signal for requesting to output the second identification signal.

According to an embodiment, the memory 103 may store one or more instructions for obtaining an image of the plurality of control devices 150.

According to an embodiment, the memory 103 may store one or more instructions for identifying the first identification signal output by the first control device 150-1 and the second identification signal output by the second control device 150-2 from the image of the plurality of control devices 150.

According to an embodiment, the memory 103 may store one or more instructions for matching an identification signal obtained from an image with an identifier of the control device 150. For example, the memory 103 may store one or more instructions for identifying a location of the identification signal identified from the image as the location of the first control device 150-1, based on the identification signal identified from the image being the same as the identification signal mapped and stored with the identifier of the first control device 150-1.

According to an embodiment, the memory 103 may store one or more instructions for identifying a change in the positional relationship between the first control device 150-1 and the second control device 150-2.

According to an embodiment, the memory 103 may store one or more instructions for re-arranging the locations of the first partial screen 110 and the second partial screen 120 to correspond to the changed positional relationship between the first control device 150-1 and the second control device 150-2.

According to an embodiment, the memory 103 may store one or more instructions for identifying the degrees of usage of the plurality of control devices 150.

According to an embodiment, the memory 103 may store one or more instructions for identifying a frequency with which a control signal for content control is received from each of the plurality of control devices 150, and identifying the degrees of usage of the plurality of control devices 150, based on the frequency.

According to an embodiment, the memory 103 may store one or more instructions for identifying a sensing signal for a movement of each of the plurality of control devices 150 received from each of the plurality of control devices 150, and for identifying the degrees of usage of the plurality of control devices 150 based on the sensing signal for the movement of each of the plurality of control devices 150.

According to an embodiment, the memory 103 may store one or more instructions for identifying a degree of change in at least one of an avatar and a background included in content, and identifying the degrees of usage of the plurality of control devices 150 based on the degree of change in the at least one of the avatar and the background.

According to an embodiment, the memory 103 may store one or more instructions for identifying a distance between a user and each of the plurality of control devices 150 from an image obtained by photographing the plurality of control devices 150, and for identifying the degrees of usage of the plurality of control devices 150 based on the distance between the user and each of the plurality of control devices 150.

According to an embodiment, the memory 103 may store one or more instructions for adjusting at least one of the size and location of at least one of the first partial screen 110 and the second partial screen 120 according to the degrees of usage of the plurality of control devices 150.

According to an embodiment, based on single integrated content in which the first content and the second content are integrated, the single integrated content being received from the server, the memory 103 may store one or more instructions for outputting the integrated content through a single screen.

According to an embodiment, the memory 103 may store one or more instructions for generating and outputting an interface screen regarding whether to output the integrated content, based on a transmission inquiry signal for integrated content being received from the server.

According to an embodiment, the memory 103 may store one or more instructions for transmitting a transmission request signal to the server for integrated content, based on the integrated content output request signal received in correspondence with the output of the interface screen.

The processor 101 according to an embodiment may control an overall operation of the electronic device 100 and signal flow between internal components of the electronic device 100, as well as perform data processing function.

According to an embodiment, the processor 101 may control the electronic device 100 to perform a function, by executing the one or more programs stored in the memory 103.

According to an embodiment, the processor 101 may include a single core, a dual core, a triple core, a quad core, or a multiple core thereof.

According to an embodiment, the processor 101 may be provided in one or a plurality. For example, the processor 101 may include a plurality of processors. The processor 101 may be implemented by using a main processor and a sub-processor.

The processor 101 may include at least one of a central processing unit (CPU), a graphics processing unit (GPU), or a video processing unit (VPU). According to an embodiment, the processor 101 may be implemented in the form of a system on chip (SOC) that integrates at least one of a CPU, a GPU, and a VPU. According to an embodiment, the processor 101 may further include a neural processing unit (NPU).

According to an embodiment, one or more processors 101 may obtain a plurality of items of content including the first content and the second content by executing the one or more instructions.

According to an embodiment, the one or more processors 101 may receive a plurality of items of content from the server by executing the one or more instructions.

According to an embodiment, the one or more processors 101 may output each of the plurality of items of content in a multi-view mode through a partial screen, based on the plurality of items of content being received from the server, by executing the one or more instructions.

According to an embodiment, the one or more processors 101 may identify the positional relationship between the plurality of control devices 150 by executing the one or more instructions.

According to an embodiment, the one or more processors 101 may arrange the first partial screen 110 outputting the first content and the second partial screen 120 outputting the second content, to correspond to the positional relationship between the plurality of control devices 150, by executing the one or more instructions.

According to an embodiment, the one or more processors 101 may transmit the identification signal output request signal to the plurality of control devices 150, by executing the one or more instructions.

According to an embodiment, the identification signal output request signal may include information requesting the output of an identification signal and the identification signal. According to an embodiment, the identification signal may include at least one of information about an LED color and information about an LED blinking time interval.

According to an embodiment, the one or more processors 101 may transmit the identification signal output request signal to the plurality of control devices 150, at preset intervals, at random intervals, and/or whenever an event occurs, by executing the one or more instructions.

According to an embodiment, the processor 101 may identify, as occurrence of an event, a case where a degree of movement of a user figure in left and right directions is greater than a threshold value, from the image captured by photographing the plurality of control devices 150 and the user.

According to an embodiment, the one or more processors 101 may identify the first identification signal and the second identification signal from information about the LED color and/or the LED blinking time interval, by executing the one or more instructions.

According to an embodiment, the one or more processors 101 may execute the one or more instructions to compare the identifier of the control device 150 stored in the memory 103 and an identification signal mapped and stored with the identifier of the control device 150 with an identification signal obtained from the image, thereby identifying a location of the identification signal identified from the image as the location of the control device 150.

According to an embodiment, the one or more processors 101 may identify the location of the first control device 150-1 from the first identification signal identified from the image and identify the location of the second control device 150-2 from the second identification signal, by executing the one or more instructions.

According to an embodiment, the one or more processors 101 may execute the one or more instructions to transmit, to the first control device 150-1, a first output request signal for requesting to output the first identification signal, and transmitting, to the second control device 150-2, a second output request signal for requesting to output the second identification signal.

According to an embodiment, the one or more processors 101 may obtain an image of the plurality of control devices 150 by executing the one or more instructions.

According to an embodiment, the one or more processors 101 may execute the one or more instructions to identify the first identification signal output by the first control device 150-1 and the second identification signal output by the second control device 150-2 from the image of the plurality of control devices 150.

According to an embodiment, the one or more processors 101 may identify a change in the positional relationship between the first control device 150-1 and the second control device 150-2 by executing the one or more instructions.

According to an embodiment, the one or more processors 101 may execute the one or more instructions to re-arrange the first partial screen 110 and the second partial screen 120 to correspond to the changed positional relationship between the first control device 150-1 and the second control device 150-2.

According to an embodiment, the one or more processors 101 may identify the degrees of usage of the plurality of control devices 150 by executing the one or more instructions.

According to an embodiment, the one or more processors 101 may execute the one or more instructions to identify a frequency with which a control signal for content control is received from each of the plurality of control devices 150, and identifying the degrees of usage of the plurality of control devices 150, based on the frequency.

According to an embodiment, the one or more processors 101 may execute the one or more instructions to identify a sensing signal for a movement of each of the plurality of control devices 150, received from each of the plurality of control devices 150 and identify the degrees of usage of the plurality of control devices 150, based on the sensing signal for the movement of each of the plurality of control devices 150.

According to an embodiment, the one or more processors 101 may execute the one or more instructions to identify a degree of change in at least one of an avatar and a background included in content, and identify the degrees of usage of the plurality of control devices 150, based on the degree of change in the at least one of the avatar and the background.

According to an embodiment, the one or more processors 101 may execute the one or more instructions to identify a distance detected between a user and the plurality of control devices 150 from the images obtained by photographing the plurality of control devices 150, and identify the usage degrees of the plurality of control devices 150, based on the distance between the user and the plurality of control devices 150.

According to an embodiment, the one or more processors 101 may execute the one or more instructions to adjust at least one of the size and location of at least one of the first partial screen 110 and the second partial screen 120 according to the degrees of usage of the plurality of control devices 150.

According to an embodiment, the one or more processors 101 may execute the one or more instructions to, based on single integrated content in which the first content and the second content are integrated, the single integrated content being received from the server, output the integrated content through a single screen.

According to an embodiment, the one or more processors 101 may execute the one or more instructions to generate and output an interface screen regarding whether to output the integrated content, based on the transmission inquiry signal being received from the server.

According to an embodiment, the one or more processors 101 may execute the one or more instructions to transmit a transmission request signal to the server for integrated content, based on the integrated content output request signal received in correspondence with the output of the interface screen.

The display 105 according to an embodiment may display, on a screen, content provided by content providers. The display 105 may output, on a screen, a broadcast program received in real time or a program, for example, of a VOD service received through streaming or downloading.

According to an embodiment, the display 105 may output metaverse content received from a server that provides metaverse content.

According to an embodiment, the display 105 may output content in a single-view mode or a multi-view mode. The display 105 may split the screen into a plurality of partial screens, and display different items of content on the plurality of partial screens to provide the different items of content in a multi-view mode. The display 105 may output the first content on the first partial screen 110, and may output the second content on the second partial screen 120.

According to an embodiment, the display 105 may output the first content and the second content through the first partial screen 110 and the second partial screen 120 by arranging the first partial screen 110 and the second partial screen 120 at locations corresponding to the positional relationship between the first control device 150-1 and the second control device 150-2.

According to an embodiment, the display 105 may output an interface screen regarding whether to output the integrated content. According to an embodiment, the display 105 may display the interface screen regarding whether to output the integrated content, on a part of the screen, by overlaying the interface screen on a plurality of items of content. The interface screen regarding whether to output the integrated content may include text, symbol, or figure asking whether outputting the integrated content is desired.

When the display 105 is implemented as a touch screen, the display 105 may be used as an input device, such as a user interface, as well as an output device. For example, the display 105 may include at least one of a liquid crystal display (LCD), a thin film transistor-LCD (TFT-LCD), an organic light-emitting diode (OLED), a flexible display, a three-dimensional (3D) display, and an electrophoretic display. According to embodiments of the display 105, the display 105 may be included in at least two.

FIG. 3 is a block diagram of the electronic device 100 and the control device 150 according to an embodiment.

Referring to FIG. 3, the electronic device 100 and the control device 150 may be connected to each other via a communication network 130.

The electronic device 100 of FIG. 3 may include the components of the electronic device 100 of FIG. 2. For additional implementation details, reference may be made to the descriptions of FIG. 2.

The electronic device 100 of FIG. 3 may further include an image obtainer 108 and a communication interface 107 in addition to the processor 101, the memory 103, and the display 105.

The image obtainer 108 according to an embodiment may include the camera 109. According to an embodiment, the camera 109 may be installed on a front surface of the electronic device 100, and obtain an image of the front surface of the electronic device 100.

The communication interface 107 according to an embodiment may perform communication with at least one control device 150 and/or an external game server, for example, providing metaverse content, through a wired or wireless communication network.

According to an embodiment, the communication interface 107 may connect the electronic device 100 to the control device 150 or, for example, a peripheral apparatus, an external apparatus, a server, or a mobile terminal, under a control by the processor 101.

The communication interface 107 may include at least one communication module capable of performing wireless communication. The communication interface 107 may include at least one of a wireless LAN module, a Bluetooth module, and a wired Ethernet in correspondence to a performance and a structure of the electronic device 100.

The communication interface 107 may include at least one short-range communication module that performs communication according to a communication standard, such as Bluetooth, Wi-Fi, Bluetooth Low Energy (BLE), NFC/RFID, Wi-Fi Direct, UWB, or ZIGBEE.

The communication interface 107 may further include a long-distance communication module for performing communication with a server for supporting long-distance communication according to a long-distance communication standard. In detail, the communication interface 107 may include a long-distance communication module for performing communication via a network for Internet communication. For example, the communication interface 107 may include a long-distance communication module for performing communication via a communication network following a communication standard such as 3G, 4G, and/or 5G.

According to an embodiment, the communication interface 107 may communicate with the control device 150 by using infrared (IR) communication, radio frequency (RF) communication, Wi-Fi communication, or BLE communication. The communication interface 107 may receive a control signal from the control device 150 via a communication with the control device 150.

According to an embodiment, when the communication interface 107 transmits and receives signals to and from the control device 150 by using IR communication, the communication interface 107 may include an IR reception module on the front of the electronic device 100. The IR reception module may include a component having optical characteristics similar to the wavelength of an IR signal transmitted by an LED transmitter included in a communication interface 155 of the control device 150.

The control device 150 according to an embodiment may be implemented as any of various types of apparatuses used to control the electronic device 100. The control device 150 may be implemented as a terminal capable of receiving various types of user input, for example, touch, pressing, a touch gesture, a voice, or a motion. For example, the control device 150 may include, but is not limited to, a portable computer, such as a laptop, a netbook, or a tablet PC, a portable terminal, such as a smartphone or PDA, a remote controller, a keyboard, a mouse, a joy pad, or a terminal in the form of an integration of two or more of these devices.

According to an embodiment, the control device 150 may include a processor 151, a memory 153, the communication interface 155, an input interface 157, and a sensing unit 158.

The memory 153 according to an embodiment may store at least one instruction. The memory 153 may store at least one program that the processor 151 executes. The memory 153 may store a predefined operation rule or a predefined program. The memory 153 may store data that is input to the control device 150 or output by the control device 150.

According to an embodiment, the memory 153 may store a key code instruction. The key code instruction may include defined key scan code values that match the data and commands input from the input interface 157. The memory 153 may include key code instructions respectively corresponding to a plurality of keys included in the input interface 157.

The memory 153 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The input interface 157 according to an embodiment may receive a user input for controlling the control device 150. The input interface 157 may be realized in various types. For example, the input interface 157 may include a plurality of keys. The keys may be any of various types, such as a physical button that receives a user's push operation, a jog & shuttle, and a key pad. The user may control various functions of the electronic device 100 by using a plurality of keys included in the control device 150. The keypad may include buttons or a touchpad. The touch pad may be realized in various types, such as, a capacitive overlay type, a resistive overlay type, an infrared beam type, a surface acoustic wave type, an integral strain gauge type, and a piezo electric type.

The input interface 157 may include a keyboard, a dome switch, a jog wheel, or a jog switch, for example. The input interface 157 may further include a microphone capable of receiving the user's voice.

The sensing unit 158 according to an embodiment may include a sensor capable of recognizing a motion of the control device 150. According to an embodiment, the control device 150 may detect a direction and/or movement of the control device 150 by using a sensor included in the sensing unit 158.

According to an embodiment, the sensing unit 158 may include a geomagnetic sensor and/or an gyroscope sensor. The geomagnetic sensor may detect a direction of geomagnetism with respect to the control device 150. The gyroscope sensor may detect an angular velocity, which is a rotational speed, of the control device 150. The gyroscope sensor may also be referred to as an angular velocity sensor. The gyroscope sensor may calculate the direction of the control device 150 by converting a Coriolis force generated when the control device 150 rotates into an electrical signal.

The sensing unit 158 may check a relative apparatus position with respect to a magnetic north pole by using at least one of the geomagnetic sensor and the gyroscope sensor. The sensing unit 158 may also detect a relative direction or movement of the control device 150 by using these sensors. According to an embodiment, the sensing unit 158 may obtain a sensing signal indicating the direction and/or movement of the control device 150. The sensing signal may be transmitted to the electronic device 100 through the communication network 130.

The communication interface 155 according to an embodiment may include at least communication module. The communication interface 155 may connect the control device 150 to the electronic device 100 under a control by the processor 151, by using a wired or wireless communication network.

The communication interface 155 may transmit, to the electronic device 100, a signal corresponding to a user input through the input interface 157. The signal corresponding to the user input may be a control signal including a key code instruction corresponding to a key selected by the user. A control signal corresponding to the user input may be implemented as a Bluetooth type, an IR signal type, an RF signal type, or a Wi-Fi type, for example, according to the type of communication module included in the communication interface 155.

According to an embodiment, the communication interface 155 may transmit the control signal to the electronic device 100 according to BLE communication and/or IR communication.

According to an embodiment, when the electronic device 100 and the control device 150 perform BLE communication to transmit and receive signals, the electronic device 100 and the control device 150 may perform pairing. When the control device 150 receives a key input from the user through the input interface 157, the control device 150 may generate, as a BLE signal, a control signal including a key code instruction corresponding to the input key. The control device 150 may transmit the BLE signal to the electronic device 100 through the communication network 130.

According to an embodiment, when the electronic device 100 and the control device 150 perform IR communication to transmit and receive signals, the control device 150 may generate a control signal including a key code instruction as an IR signal. For example, the control device 150 may generate an IR signal having a unique frequency assigned to the key code instruction of the input key.

According to an embodiment, the communication interface 155 may include the LED transmitter. The LED transmitter may be provided on the top of the control device 150, for example, and may transmit light of a predetermined wavelength to the electronic device 100. The LED transmitter may include an IR LED. The IR LED may transmit a control signal generated as the IR signal. According to an embodiment, the IR signal may be an IR signal of a predetermined wavelength having a unique frequency assigned to the key code instruction of the input key.

According to an embodiment, when the LED transmitter included in the communication interface 155 receives an identification signal output request signal from the electronic device 100, the LED transmitter may output an identification signal according to the received identification signal output request signal.

According to an embodiment, the LED transmitter included in the communication interface 155 may output an identification signal requested by the electronic device 100. According to an embodiment, the LED transmitter included in the communication interface 155 may output an identification signal having an LED color and an LED blinking time interval requested by the electronic device 100.

According to an embodiment, the LED transmitter included in the communication interface 155 may continuously output the identification signal while being turned on by not being turned off after outputting the identification signal. The LED transmitter included in the communication interface 155 may be turned off to save power after initially outputting the identification signal. The LED transmitter included in the communication interface 155 may be turned on again at regular intervals or at random intervals to output the identification signal.

According to an embodiment, when the user inputs a key notifying the electronic device 100 of a change in the locations of the plurality of users by using the control device 150, the LED transmitter included in the communication interface 155 may output the identification signal in response to the key.

According to an embodiment, the communication interface 155 may transmit a sensing signal regarding the movement of the control device 150 sensed by the sensing unit 158 to the electronic device 100 through the communication network 130.

According to an embodiment, the communication network 130 may include one or more networks from among Bluetooth, BLE, NFC, IR communication, RF communication, Wi-Fi communication, and wired Ethernet.

The processor 151 according to an embodiment controls all operations of the control device 150. The processor 151 may control the control device 150 to perform a function, by executing the one or more programs stored in the memory 153.

According to an embodiment, the processor 151 may be, for example, a micro controller unit (MCU).

According to an embodiment, when the processor 151 receives a key input from the user through the input interface 157, the processor 151 may generate a control signal including a key code instruction corresponding to the input key.

According to an embodiment, the processor 151 may control the communication interface 155 so that the identification signal is output through the LED transmitter included in the communication interface 155.

According to an embodiment, when the processor 151 receives an identification signal output request signal from the electronic device 100, the processor 151 may control the communication interface 155 to output the identification signal in response to the identification signal output request signal.

According to an embodiment, the processor 151 may control the LED transmitter included in the communication interface 155 to output the identification signal according to the LED color and LED blinking cycle of the identification signal requested by the electronic device 100.

According to an embodiment, after initially outputting the identification signal output request signal, the processor 151 may control the LED transmitter included in the communication interface 155 to be continuously turned on and output the identification signal.

According to an embodiment, after the processor 151 receives the identification signal output request signal from the electronic device 100 for the first time, the processor 151 may control the LED transmitter included in the communication interface 155 to output the identification signal at regular intervals or at random intervals without receiving the identification signal output request signal from the electronic device 100 again.

In some cases, when the locations of the plurality of users change, the user may use the control device 150 to notify the electronic device 100 of the change in the locations of the plurality of users. For example, the user may input a key included in the control device 150 to notify the electronic device 100 of the change in the locations of the plurality of users.

According to an embodiment, when the user inputs a key by using the input interface 157, the processor 151 may determine the input of the key as an identification signal output request, and accordingly may control the LED transmitter included in the communication interface 155 to output the identification signal.

Figure 4:
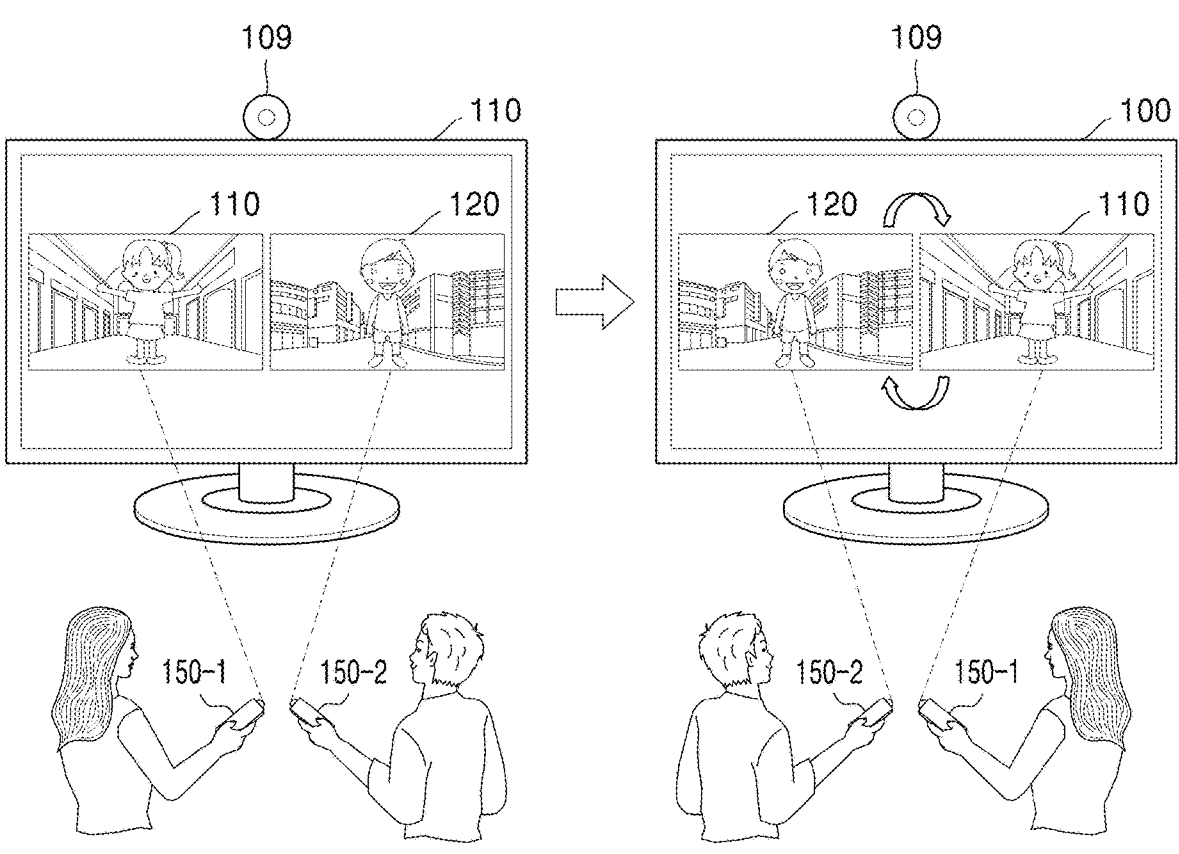
FIG. 4 is a diagram illustrating an electronic device re-arranging a partial screen to correspond to a change in a positional relationship between control devices, according to an embodiment.

FIG. 4 is a diagram illustrating the electronic device 100 re-arranging a partial screen to correspond to a change in a positional relationship between control devices 150, according to an embodiment.

Referring to FIG. 4, according to an embodiment, the electronic device 100 may be controlled by the plurality of control devices 150. According to an embodiment, the plurality of control devices 150 may include the first control device 150-1 and the second control device 150-2. According to an embodiment, the first control device 150-1 may be used to control the first content and the second control device 150-2 may be used to control the second content.

According to an embodiment, the electronic device 100 may simultaneously output a plurality of items of content controlled by the plurality of control devices 150, in correspondence with the electronic device 100 being controlled by the plurality of control devices 150. According to an embodiment, the electronic device 100 may output the first content through the first partial screen 110 and output the second content through the second partial screen 120, thereby simultaneously outputting the plurality of items of content in the multi-view mode.

According to an embodiment, the electronic device 100 may identify the positional relationship between the plurality of control devices 150, in correspondence with the electronic device 100 being controlled by the plurality of control devices 150.

According to an embodiment, the electronic device 100 may transmit, to the first control device 150-1, a first output request signal for requesting to output a first identification signal, in order to identify the positional relationship between the plurality of control devices 150. According to an embodiment, the first control device 150-1 may receive the first output request signal from the electronic device 100, and thus may output the first identification signal.

According to an embodiment, the electronic device 100 may transmit, to the second control device 150-2, a second output request signal for requesting to output a second identification signal. According to an embodiment, the second control device 150-2 may receive the second output request signal from the electronic device 100, and thus may output the second identification signal.

According to an embodiment, the first identification signal and the second identification signal may be signals that are different from each other in terms of at least one of an LED color and an LED blinking time interval.

According to an embodiment, the electronic device 100 may use the camera 109 to identify identification signals output by the plurality of control devices 150. According to an embodiment, the camera 109 may be installed on a front upper surface, for example, of the electronic device 100, and obtain an image of the front surface of the electronic device 100 by photographing a subject located on the front surface. This is an example of an embodiment, and a location of the camera 109 or the number of arranged cameras may vary.

According to an embodiment, the electronic device 100 may obtain an image of the first control device 150-1 and the second control device 150-2 by photographing the first control device 150-1 and the second control device 150-2.

According to an embodiment, the camera 109 may continuously obtain the image of the first control device 150-1 and the second control device 150-2 while outputting game content, in correspondence with the electronic device 100 being controlled by the plurality of control devices 150.

According to an embodiment, the electronic device 100 may identify identification signals respectively transmitted by the first control device 150-1 and the second control device 150-2 from the image of the first control device 150-1 and the second control device 150-2.

According to an embodiment, the electronic device 100 may identify what control device 150 transmits an identification signal, by comparing an identification signal identified from an image with an identification signal of each control device 150 pre-stored in the memory 103. For example, when an LED color and LED blinking time interval of the identification signal identified from the image are the same as an LED color and LED blinking time interval of the identification signal included in the first output request signal transmitted to the first control device 150-1, the electronic device 100 may identify that the identification signal in the image is an identification signal from the first control device 150-1, and may identify the location of the first control device 150-1.

According to an embodiment, the electronic device 100 may identify a positional relationship between the first control device 150-1 and the second control device 150-2, based on the first identification signal output by the first control device 150-1 and the second identification signal output by the second control device 150-2. For example, the positional relationship between the first control device 150-1 and the second control device 150-2 may include a positional relationship between the plurality of control devices 150 in left and right directions.

According to an embodiment, the electronic device 100 may output a plurality of items of content by allowing the positional relationship between the first control device 150-1 and the second control device 150-2 to correspond to a positional relationship between partial screens.

Referring to the left drawing of FIG. 4, it may be seen that the first control device 150-1 and the second control device 150-2 are located on the left and right sides, respectively, based on a direction in which the electronic device 100 is viewed. The electronic device 100 may output the first content and the second content through the first partial screen 110 and the second partial screen 120 by allowing the first partial screen 110 outputting the first content to be positioned in the left direction and the second partial screen 120 outputting second content to be positioned in the right direction.

According to an embodiment, the electronic device 100 may identify a change in the positional relationship between the plurality of control devices 150. According to an embodiment, the electronic device 100 may continuously obtain the image of the first control device 150-1 and the second control device 150-2 by using the camera 109, in order to identify the change in the positional relationship between the plurality of control devices 150.

According to an embodiment, the plurality of control devices 150 may continuously transmit identification signals.

Every time the plurality of control devices 150 are requested by the electronic device 100 to output identification signals, the plurality of control devices 150 may transmit the identification signals.

According to an embodiment, the electronic device 100 may periodically transmit an identification signal output request signal to the control device 150. At regular intervals, at random intervals, or every time an event occurs, the electronic device 100 may transmit, to the control device 150, an identification signal output request signal for requesting to output an identification signal.

According to an embodiment, the electronic device 100 may detect a plurality of users for controlling game content by using the first control device 150-1 and the second control device 150-2, from an image obtained using the camera 109. According to an embodiment, the electronic device 100 may perform object detection. According to an embodiment, the electronic device 100 may detect an object from the image by using image processing technology or artificial intelligence technology. For example, the electronic device 100 may perform object detection by recognizing an object from the image, classifying what the object is, and localizing the object by using a deep neural network (DNN) including two or more hidden layers.

According to an embodiment, the electronic device 100 may perform object detection to detect a person from the image. According to an embodiment, the electronic device 100 may track a change in a location of the person detected from the image, and, when the change in the location of the person is equal to or greater than a threshold, may detect this case as an event.

According to an embodiment, when an event is detected, the electronic device 100 may transmit the first output request signal and the second output request signal to the first control device 150-1 and the second control device 150-2.

According to an embodiment, every time when the first control device 150-1 and the second control device 150-2 receive the first output request signal and the second output request signal from the electronic device 100, the first control device 150-1 and the second control device 150-2 may output the first identification signal and the second identification signal in correspondence with the first output request signal and the second output request signal.

According to an embodiment, the electronic device 100 may identify a change in the positional relationship between the first control device 150-1 and the second control device 150-2, based on the first identification signal output by the first control device 150-1 and the second identification signal output by the second control device 150-2.

According to an embodiment, the electronic device 100 may identify whether the locations of the first control device 150-1 and the second control device 150-2 have been changed in the left and right directions, based on the first identification signal output by the first control device 150-1 and the second identification signal output by the second control device 150-2, by in real time analyzing the image obtained by photographing the first control device 150-1 and the second control device 150-2.

According to an embodiment, when it is determined that the locations of the first control device 150-1 and the second control device 150-2 have been changed in the left and right directions, the electronic device 100 may output a plurality of items of content by re-arranging the first partial screen 110 and the second partial screen 120, based on the changed positional relationship between the first control device 150-1 and the second control device 150-2.

Referring to the right drawing of FIG. 4, it may be seen that a user using the first control device 150-1 and a user using the second control device 150-2 are changed and thus the respective locations of the first control device 150-1 and the second control device 150-2 are changed.

According to an embodiment, in correspondence with the respective locations of the first control device 150-1 and the second control device 150-2 being changed, the electronic device 100 may change the locations of the first partial screen 110 and the second partial screen 120 in the left and right directions so that a left-right relationship between the first partial screen 110 outputting the first content and the second partial screen 120 outputting the second content is the same as a changed left-right relationship between the first control device 150-1 and the second control device 150-2. According to an embodiment, the electronic device 100 may output content through a partial screen positioned at a changed location, so that respective locations of the content and the control device 150 correspond to each other.

Figure 5:
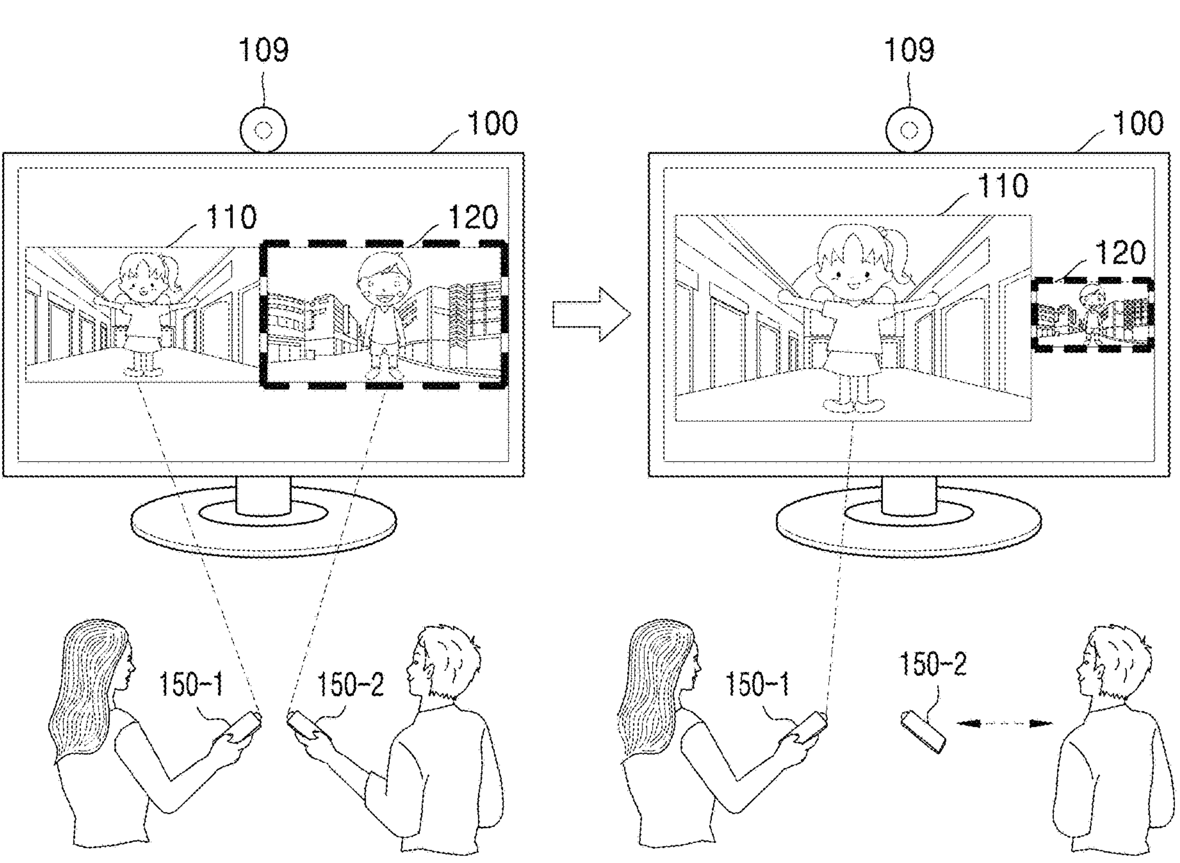
FIG. 5 is a diagram illustrating an electronic device adjusting a partial screen according to a degree of usage of a control device, according to an embodiment.

FIG. 5 is a diagram illustrating the electronic device 100 adjusting a partial screen according to a degree of usage of the control device 150, according to an embodiment.

Referring to FIG. 5, according to an embodiment, the electronic device 100 may simultaneously output a plurality of items of content controlled by the plurality of control devices 150, in correspondence with the electronic device 100 being controlled by the plurality of control devices 150. According to an embodiment, the electronic device 100 may output the first content through the first partial screen 110 and output the second content through the second partial screen 120, thereby simultaneously outputting the plurality of items of content in the multi-view mode.

The left drawing of FIG. 5 illustrates a case in which the electronic device 100 outputs the first partial screen 110 and the second partial screen 120 having the same sizes.

According to an embodiment, the electronic device 100 may identify the degrees of usage of the plurality of control devices 150, in correspondence with the electronic device 100 being controlled by the plurality of control devices 150. According to an embodiment, the degrees of usage of the plurality of control devices 150 may indicate use or non-use of the plurality of control devices 150 by users, and the amounts or frequencies of usage of the plurality of control devices 150 by the users.

According to an embodiment, the electronic device 100 may identify the degrees of usage of the plurality of control devices 150 according to various methods.

For example, based on a frequency with which a control signal for content control is received from each of the plurality of control devices 150, the electronic device 100 may identify the degrees of usage of the plurality of control devices 150.

For example, based on a sensing signal indicating a movement of each of the plurality of control devices 150, the sensing signal received from each of the plurality of control devices 150, the electronic device 100 may identify the degrees of usage of the plurality of control devices 150.

According to an embodiment, the plurality of control devices 150 may include sensors that sense movements of the plurality of control devices 150. According to an embodiment, the control device 150 may transmit a sensing signal indicating a movement of the control device 150 to the electronic device 100 periodically or whenever the movement of the control device 150 is sensed.

According to an embodiment, based on the sensing signals received from the plurality of control devices 150, the electronic device 100 may identify degrees of the movements of the plurality of control devices 150, and may identify the degrees of usage of the plurality of control devices 150, based on the degrees of the movements of the plurality of control devices 150. When the frequency of receiving a sensing signal from the control device 150 is low or the sensing signal indicates that the degree of movement of the control device 150 is low, the electronic device 100 may determine that the degree of usage of the control device 150 is low.

For example, the electronic device 100 may identify the degree of usage of the control device 150, based on content output to the screen. The electronic device 100 may identify the degree of usage of the control device 150, based on a degree of change in at least one of an avatar and a background included in the content. For example, when one of a plurality of users no longer uses game content, content that the one user has controlled is likely to remain unchanged on avatar and/or background screens for a preset period of time.

According to an embodiment, the electronic device 100 may capture content that is periodically output through a partial screen by using an internal camera. The electronic device 100 may identify whether there is a change in the content, by comparing a previously captured screen with a currently captured screen. The electronic device 100 may identify a plurality of items of content from a captured screen, and may compare each of the plurality of items of content with content included in a previously captured screen. According to an embodiment, the electronic device 100 may identify the degree of usage of the control device 150 controlling each content, based on whether the avatar and/or background screens included in the content are identical to each other. The electronic device 100 may determine that a user does not use the control device 150, when there is no change in an action or movement of the avatar included in the content and/or the background included in the content or the degree of the change is less than or equal to a reference value.

For example, based on distances between the plurality of users and the plurality of control devices 150, detected from the images obtained by photographing the plurality of control devices 150, the electronic device 100 may identify degrees of usage of the plurality of control devices 150. According to an embodiment, the electronic device 100 may obtain an image of the plurality of control devices 150 and the plurality of users, by using the camera 109 included in the electronic device 100. According to an embodiment, the electronic device 100 may identify positional relationships between the plurality of control devices 150 and the plurality of users, based on the image of the plurality of control devices 150 and the plurality of users. According to an embodiment, the electronic device 100 may identify a human figure from the image by using an image detection technique. The electronic device 100 may also identify an identification signal's location from the image.

According to an embodiment, based on a positional relationship between the human figure and the identification signal identified from the image, the electronic device 100 may determine that the user does not use the control device 150, when the human figure and the identification signal overlap each other or are apart from each other by a certain threshold or less. The electronic device 100 may identify that the control device 150 is not used, when a distance between the human figure and the identification signal is equal to or greater than the certain threshold.

The above description is an example of an embodiment, and a method in which the electronic device 100 identifies the degree of usage of the control device 150 may be implemented in various other forms.

According to an embodiment, the electronic device 100 may identify the degree of usage of the control device 150 and may adjust the screen on which content controlled by the control device 150 is output.

According to an embodiment, as for content controlled by a control device 150 whose usage degree is equal to or lower than a threshold, the electronic device 100 may output the content by reducing the size of a partial screen where the content is output, and/or move and output, to an outer portion of the screen, the location of the partial screen where the content is output.

FIG. 5 illustrates, in an embodiment, the electronic device 100 identifying the degrees of usage of the first control device 150-1 and the second control device 150-2 and adjusting a partial screen accordingly. According to an embodiment, when the electronic device 100 determines that the degree of usage of the second control device 150-2 is less than or equal to the threshold, the electronic device 100 may output the first partial screen 110 and the second partial screen 120 with different sizes, as shown in the right drawing of FIG. 5. For example, as for the second content controlled by the second control device 150-2 whose usage degree is less than or equal to the threshold, the electronic device 100 may reduce a size of the second partial screen 120 on which the second content is output to a size smaller than the original screen size, and position the second partial screen 120 at the outer portion of the screen, thereby outputting the second content with a smaller size than the original size through the second partial screen 120 whose size and location have been changed.

According to an embodiment, the electronic device 100 may also change the size of the first partial screen 110 in correspondence with the change in the size of the second partial screen 120. According to an embodiment, the electronic device 100 may change the size of the first partial screen 110 to a size greater than the original size, in correspondence with the reduction of the size of the second partial screen 120, thereby outputting the first content with a size greater than the original. The electronic device 100 may move the location of the first partial screen 110 toward the center of the screen in correspondence with the location of the second partial screen 120 moving toward the outer portion of the screen, so that the first content is output from the center of the screen.

As such, according to an embodiment, the electronic device 100 may identify the degrees of use of the plurality of control devices 150, and adjust at least one of the size and location of the partial screen, based on the degrees of usage. The electronic device 100 may provide items of content of different sizes to a user who does not use the control device 150 or have a low usage frequency and to a user who uses the control device 150 or have a high usage frequency, thereby outputting screens corresponding to the users' usage frequencies.

FIG. 5 illustrates, as an example, the electronic device 100 adjusting the sizes or locations of partial screens according to the degrees of usage of control devices 150. However, embodiments of the present disclosure are not limited thereto, and the electronic device 100 may adjust the sizes of partial screens on which the plurality of items of content are output with different sizes in various situations.

For example, the plurality of control devices 150 may be divided into a main control device and a sub-control device. According to an embodiment, the electronic device 100 may set a partial screen on which content controlled by the main control device is output to be larger than a partial screen on which content controlled by the sub control device is output, so that the content controlled by the main control device may be output with a larger size than the content controlled by the sub control device.

According to an embodiment, the electronic device 100 may arrange, at the center of the screen, the partial screen on which the content controlled by the main control device is output and arrange, at the outer portion of the screen, the partial screen on which the content controlled by the sub control device is output, so that the content controlled by the main control device may be output more centrally than the content controlled by the sub control device.

According to an embodiment, which control device among the plurality of control devices 150 is the main control device and which control device is the sub-control device may be preset by default. By using a setting function of the electronic device 100 or the control device 150, the user may set a control device as the main control device and another control device as the sub-control device, or may change the settings.

Figure 6:
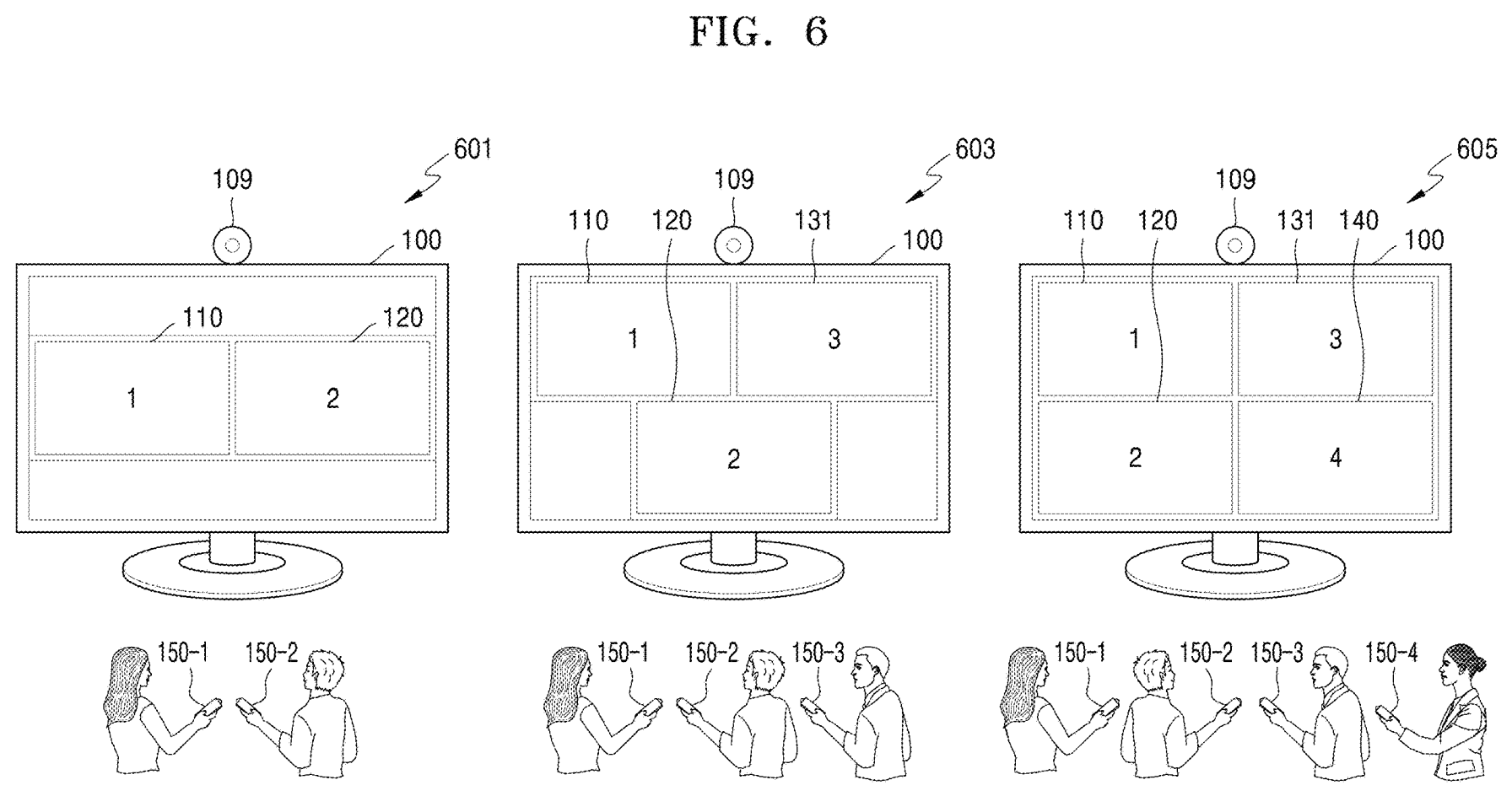

FIG. 6 is a diagram illustrating the electronic device 100 outputting a plurality of items of content, according to an embodiment.

Referring to FIG. 6, according to an embodiment, the electronic device 100 may be controlled by a plurality of control devices 150. According to an embodiment, the electronic device 100 may generate as many partial screens as the number of players, and may output a plurality of items of content through a plurality of partial screens, respectively. According to an embodiment, the electronic device 100 may determine a location of a partial screen, based on a positional relationship between control devices 150. The electronic device 100 may output content that is controlled each of the control devices 150, through a partial screen positioned at the determined location.

Reference numeral 601 illustrates, in an embodiment, a case where the electronic device 100 outputs two items of content controlled by two control devices 150. According to an embodiment, the electronic device 100 may output first content and second content that are controlled by the first control device 150-1 and the second control device 150-2, in a multi-view mode. According to an embodiment, the electronic device 100 may determine respective locations of the first partial screen 110 and the second partial screen 120 each outputting content, based on a positional relationship between the first control device 150-1 and the second control device 150-2. According to an embodiment, the electronic device 100 may arrange the first partial screen 110 and the second partial screen 120 at the determined locations, and may output the first content and the second content through the first partial screen 110 and the second partial screen 120, respectively.

Reference numeral 603 illustrates, in an embodiment, a case where the electronic device 100 outputs three items of content controlled by three control devices 150. According to an embodiment, the electronic device 100 may output first content, second content, and third content that are controlled by a first control device 150-1, a second control device 150-2, and a third control device 150-3, in a multi-view mode. According to an embodiment, the electronic device 100 may determine respective locations of a first partial screen 110, a second partial screen 120, and a third partial screen 530 respectively outputting the first content, the second content, and the third content, based on a positional relationship between the first control device 150-1, the second control device 150-2, and the third control device 150-3.

For example, as illustrated by reference numeral 603, the electronic device 100 may arrange the first partial screen 110 and the third partial screen 131 on left and right upper portions of a screen, respectively, and arrange the second partial screen 120 at a center of the screen below the first partial screen 110 and the third partial screen 131, based on a direction in which the electronic device 100 is viewed. This is an example of an embodiment, and the electronic device 100 may arrange the first partial screen 110 and the third partial screen 530 on left and right lower portions of the screen, respectively, and arrange the second partial screen 120 at a center of the screen above the first partial screen 110 and the third partial screen 530. The electronic device 100 may arrange three partial screens in a row from left to right. For example, the electronic device 100 may arrange the first partial screen 110, the second partial screen 120, and the third partial screen 131 on a left portion, a center portion, and a right portion of the screen, respectively.

According to an embodiment, the electronic device 100 may output the first content, the second content, and the third content through the first partial screen 110, the second partial screen 120, and the third partial screen 530, respectively.

Reference numeral 605 illustrates, in an embodiment, a case where the electronic device 100 outputs four items of content controlled by four control devices 150. According to an embodiment, the electronic device 100 may output first content, second content, third content, and fourth content that are controlled by a first control device 150-1, a second control device 150-2, a third control device 150-3, and a fourth control device 150-4, in a multi-view mode. According to an embodiment, the electronic device 100 may determine respective locations of a first partial screen 110, a second partial screen 120, a third partial screen 131, and a fourth partial screen 140 respectively outputting the first content, the second content, the third content, and the fourth content, based on a positional relationship between the first control device 150-1, the second control device 150-2, the third control device 150-3, and the fourth control device 150-4.

For example, as illustrated by reference numeral 605, the electronic device 100 may arrange the first partial screen 110 and the third partial screen 131 on left and right upper portions of a screen, respectively, and arrange the second partial screen 120 and the fourth partial screen 140 on left and right lower portions of the screen, respectively. This is an example of an embodiment, and the electronic device 100 may arrange the first partial screen 110 and the third partial screen 131 on the left and right lower portions of the screen, respectively, and arrange the second partial screen 120 and the fourth partial screen 140 on the left and right upper portions of the screen, respectively.

The electronic device 100 may arrange four partial screens in a row from left to right. The electronic device 100 may also arrange the first partial screen 110, the second partial screen 120, the third partial screen 131, and the fourth partial screen 140 side by side from left to right.

According to an embodiment, the electronic device 100 may arrange the first through fourth partial screens 110 through 140 at the determined locations, and may output the first through fourth items of content through the first through fourth partial screens 110 through 140, respectively.

As such, according to an embodiment, when the electronic device 100 outputs a plurality of items of content controlled by a plurality of control devices 150, the electronic device 100 may arrange partial screens so that items of content are output at locations corresponding to the positional relationship between the control devices 150, and may output a plurality of items of content on the arranged partial screens. When a plurality of users control a plurality of items of content, respectively, by using one electronic device 100, the plurality of users may control the plurality of items of content while viewing the plurality of items of content output from locations corresponding to the plurality of users' locations on the screen of the electronic device 100, and thus may more intuitively and identify the plurality of items of content they control.

Figure 7:
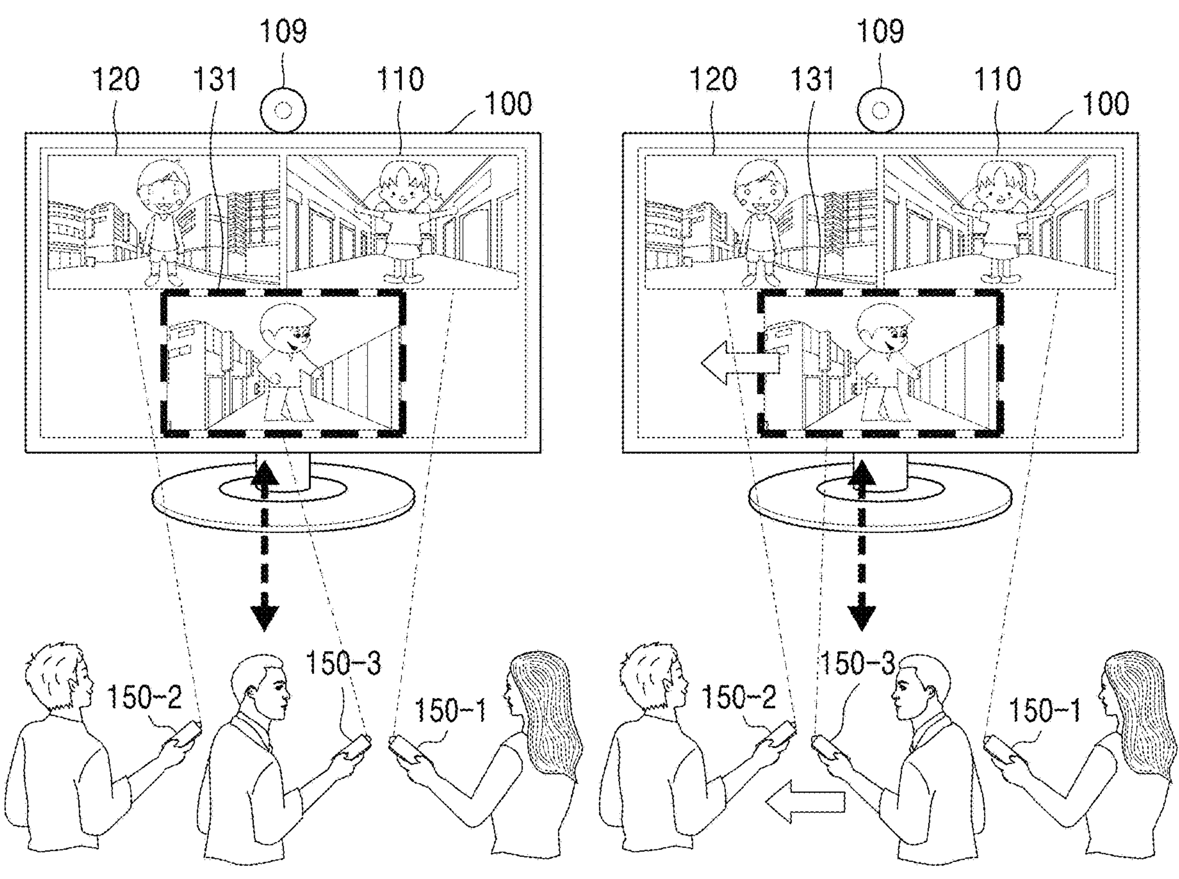
FIG. 7 is a diagram illustrating an electronic device adjusting a location of a partial screen according to a location of a control device, according to an embodiment.

FIG. 7 is a diagram illustrating the electronic device 100 adjusting the location of a partial screen according to a location of the control device 150, according to an embodiment.

In an embodiment, FIG. 7 illustrates a case where the electronic device 100 outputs three items of content controlled by three control devices 150. According to an embodiment, the electronic device 100 may determine respective locations of the first partial screen 110, the second partial screen 120, and the third partial screen 131 respectively outputting the first content, the second content, and the third content, based on a positional relationship between the first control device 150-1, the second control device 150-2, and the third control device 150-3, arrange the partial screens on the determined locations, and output the first content, the second content, and the third content on the partial screens.

According to an embodiment, the electronic device 100 may arrange the third partial screen 131 and the first partial screen 110 on the left and right upper portions of the screen, respectively, and arrange the second partial screen 120 at a lower center portion of the screen.

According to an embodiment, the electronic device 100 may identify that there is an empty space on the entire screen on both sides of the second partial screen 120. According to an embodiment, the electronic device 100 may identify that the location of the second partial screen 120 may move to the left or right.

According to an embodiment, the electronic device 100 may identify a change in the location of the control device 150 from an image of a plurality of control devices 150 obtained using the camera 109. According to an embodiment, the electronic device 100 may identify a change in the location of the second control device 150-2 corresponding to the second partial screen 120 movable to both sides, from among the plurality of control devices 150.

In an embodiment, when the second control device 150-2 moves a distance equal to or greater than a threshold value to the left or right, the electronic device 100 may correspondingly move the location of the second partial screen 120 to the left or right so that second content is output at the moved location.

Figure 8:
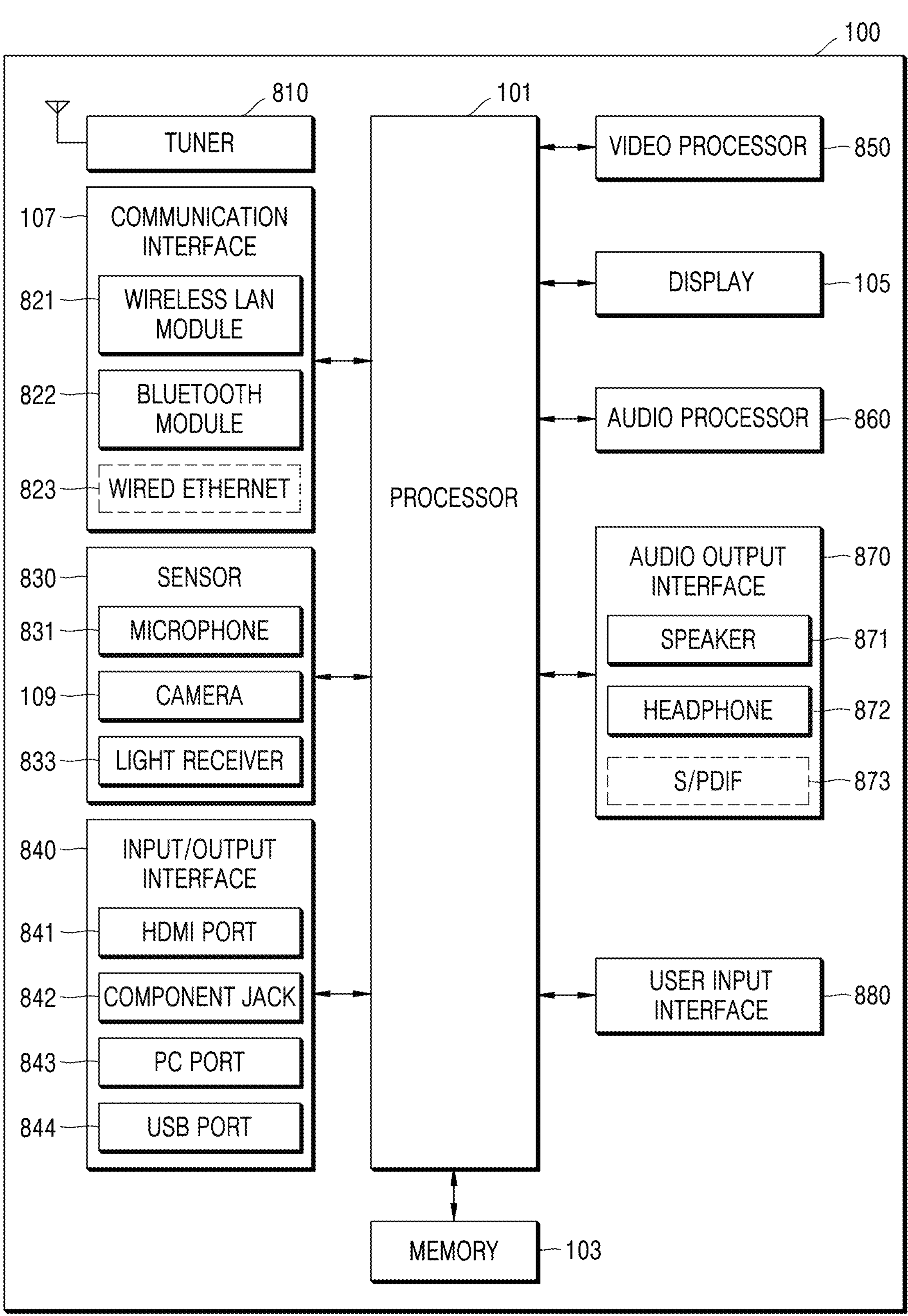
FIG. 8 is a block diagram of an electronic device according to an embodiment.

FIG. 8 is a block diagram of the electronic device 100 according to an embodiment.

The electronic device 100 of FIG. 8 may be an example of the electronic device 100 of FIGS. 2 and/or 3. For additional implementation details, reference may be made to the descriptions of FIGS. 2 and 3.

Referring to FIG. 8, the electronic device 100 may further include a tuner 810, a sensor 830, an input/output (I/O) interface 840, a video processor 850, an audio processor 860, an audio output interface 870, and a user input interface 880 in addition to the processor 101, the memory 103, the display 105, and the communication interface 107.

The tuner 810 may tune and select only a frequency of a channel which the electronic device 100 wants to receive from among many radio wave components that are obtained via amplification, mixing, resonance, or the like of wired or wireless broadcasting content. Content received through the tuner 810 is decoded and separated into audio, video, and/or additional information. The audio, the video, and/or the additional information may be stored in the memory 103 under a control by the processor 101.

According to an embodiment, the communication interface 107 may connect the electronic device 100 to, for example, a peripheral apparatus, an external device, a server, or a mobile terminal, under a control by the processor 101. The communication interface 107 may include at least one communication module capable of performing wireless communication. The communication interface 107 may include at least one of a wireless LAN module 821, a Bluetooth module 822, and a wired Ethernet 823 in correspondence to a performance and a structure of the electronic device 100.

The Bluetooth module 822 may receive a transmitted Bluetooth signal from the peripheral apparatus according to the Bluetooth communication standard. The Bluetooth module 822 may be a Bluetooth Low Energy (BLE) communication module, and may receive a BLE signal. The Bluetooth module 822 may continuously or temporarily scan the BLE signal in order to detect whether the BLE signal is received. The wireless LAN module 821 may transmit or receive a Wi-Fi signal to or from the peripheral apparatus according to the Wi-Fi communication standard.

The sensor 830 senses a voice of a user, an image of the user, or an interaction of the user, and may include a microphone 831, the camera 109, and a light receiver 833. The microphone 831 may receive an audio signal including a voice uttered by a user or noise, transform the received audio signal into an electrical signal, and output the electrical signal to the processor 101.

The camera 109 may include a sensor and a lens, and may capture an image formed on a screen and transmit the captured image to the processor 101.

According to an embodiment, the camera 109 may photograph the plurality of control devices 150 and the plurality of users located in front of the camera 109, in correspondence with the plurality of users using content with the plurality of control devices 150. According to an embodiment, the camera 109 may photograph identification signals transmitted by the plurality of control devices 150.

The light receiver 833 may receive an optical signal (including a control signal). The light receiver 833 may receive an optical signal corresponding to a user input (for example, touch, pressing, a touch gesture, a voice, or a motion) from the control device 150, such as a remote controller or a mobile phone.

The I/O interface 840 may receive video (for example, a moving image signal or a still image signal), audio (for example, a voice signal or a music signal), and additional information from, for example, an external server, under a control by the processor 101.

The I/O interface 840 may include a High-Definition Multimedia Interface (HDMI) port 841, a component jack 842, a PC port 843, or a USB port 844. The I/O interface 840 may include a combination of the HDMI port 841, the component jack 842, the PC port 843, and the USB port 844.

The video processor 850 may process image data that is to be displayed on the display 105, and may perform a variety of image processing, such as decoding, rendering, scaling, noise filtering, frame rate transformation, and resolution transformation, on the image data.

The display 105 may output, on a screen, content received from a broadcasting station, received from an external apparatus, such as an external server or an external storage medium, or provided by various apps, such as an OTT service provider or a metaverse content provider. The content is a media signal, and may include a video signal, an image, a text signal, and the like.

According to an embodiment, the display 105 may output metaverse content received from a server. According to an embodiment, the display 105 may output a plurality of items of content controlled by the plurality of control devices 150 in a multi-view mode. According to an embodiment, the display 105 may arrange partial screens outputting a plurality of items of content, in correspondence with the positional relationship between the plurality of control devices 150, and may output the plurality of items of content on the partial screens.

According to an embodiment, the display 105 may output an interface screen regarding whether to output single integrated content that integrates a plurality of items of content from the server. According to an embodiment, in correspondence with the reception of the integrated content from the server, the display 105 may output the integrated content in a single-view mode.

The audio processor 860 processes audio data. The audio processor 860 may perform a variety of processing, such as decoding, amplification, or noise filtering, on the audio data.

The audio output interface 870 may output audio included in the content received via the tuner 810, audio that is input via the communication interface 820 or the I/O interface 840, and audio stored in the memory 103 under the control by the processor 101. The audio output interface 870 may include at least one of a speaker 871, a headphone 872, or a Sony/Philips Digital Interface (S/PDIF) output port 873.

The user input interface 880 may receive a user input for controlling the electronic device 100. The user input interface 880 may include, but is not limited to, various types of user input devices including a touch panel for sensing a user's touch, a button for receiving a user's push operation, a wheel for receiving a user's rotation operation, a keyboard, a dome switch, a microphone for voice recognition, and a motion detection sensor. According to an embodiment, when the control device 150 controls the electronic device 100, the user input interface 890 may receive a control signal received from the control device 150.

Figure 9:
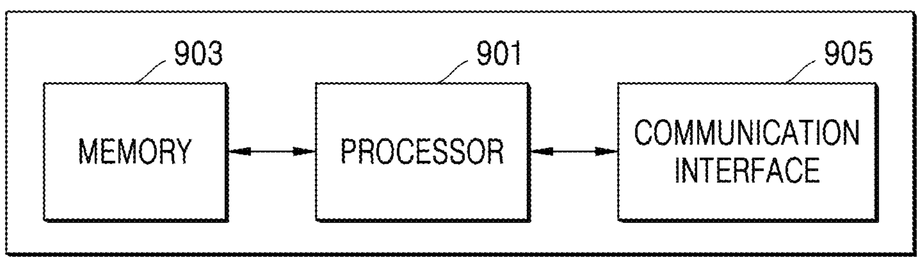
FIG. 9 is a block diagram of a server according to an embodiment.

FIG. 9 is a block diagram of a server 900 according to an embodiment.

According to an embodiment, the server 900 may be a sever that provides game content.

Referring to FIG. 9, the server 900 may include a processor 901, a memory 903, and a communication interface 905.

According to an embodiment, the memory 903 may store at least one instruction. The memory 903 may store at least one program that the processor 901 executes. The memory 903 may store data that is input to the server 900 or output from the server 900. The memory 903 may include a database storing various items of game content.

The communication interface 905 according to an embodiment may perform communication with the electronic device 100 through a wired or wireless communication network. The communication interface 905 may connect the server 900 to the electronic device 100, another device, a peripheral apparatus, an external apparatus, another server, or a mobile terminal, for example, under a control by the processor 901. The communication interface 107 may include a long-distance communication module for supporting long-distance communication according to a long-distance communication standard. In detail, the communication interface 905 may include a long-distance communication module for performing communication via a network for Internet communication. The communication interface 905 may include a long-distance communication module for performing communication via a communication network following a communication standard such as 3G, 4G, and/or 5G.

According to an embodiment, the processor 901 may control an overall operation of the server 900 and signal transfer among internal components of the server 900, and may process data. According to an embodiment, the processor 901 may control the server 900 to perform a function, by executing the one or more programs stored in the memory 903.

According to an embodiment, the processor 901 may provide content to the electronic device 100 upon request of the electronic device 100. According to an embodiment, the processor 901 may provide a plurality of items of content to the one electronic device 100 upon request of the electronic device 100. According to an embodiment, the communication interface 905 may generate different individual items of content controlled by different control devices 150, and may transmit the same to the electronic device 100 through the communication interface 905.

According to an embodiment, the processor 901 may identify relevance of a plurality of individual items of content when providing the plurality of individual items of content to the single electronic device 100. According to an embodiment, the processor 901 may identify the relevance of the plurality of individual items of content, based on a distance on a virtual space between the individual items of content. For example, the processor 901 may consider whether a virtual space of first content and a virtual space of second content are close to each other.

According to an embodiment, when a distance between the virtual space of the first content and the virtual space of the second content is less than or equal to a threshold, the processor 901 may generate the integrated content. According to an embodiment, the distance between the virtual space of the first content and the virtual space of the second content being less than or equal to the threshold may include a distance on a virtual space between a first avatar appearing in the first content and a second avatar appearing in the second content being less than or equal to a threshold.

According to an embodiment, the processor 901 may determine whether the distance on the virtual space between the first avatar and the second avatar is less than or equal to the threshold, and, when the distance on the virtual space between the first avatar and the second avatar is less than or equal to the threshold, may integrate the individual items of content transmitted separately, for example, the first content and the second content, to generate a single item of integrated content.

According to an embodiment, the integrated content may be content that includes both the first avatar appearing in the first content and the second avatar appearing in the second content.

According to an embodiment, the integrated content may be content with a different view than the individual items of content. For example, unlike the first content, which is individual content, including only the first avatar, and the second content, which is individual content, including only the second avatar, the integrated content includes both the first avatar and the second avatar, so the integrated content may be content of the same type as a type generated from the perspective of a virtual third party capable of viewing both the first avatar and the second avatar, rather than from the perspective of the first avatar or the perspective of the second avatar.

According to an embodiment, when the distance between the virtual space of the first content and the virtual space of the second content is less than or equal to the threshold, the processor 901 may inquire the electronic device 100 about whether to transmit the integrated content, before generating the integrated content. According to an embodiment, the processor 901 may transmit a transmission inquiry signal to the electronic device 100, for integrated content, through the communication interface 905.

According to an embodiment, the electronic device 100 may output an interface screen regarding whether to output the integrated content, through the display 105, based on the transmission inquiry signal being received from the server 900. The interface screen regarding whether to output the integrated content may be a kind of pop-up screen. A user may view the interface screen displayed on the display 105, and may input an integrated content output request signal requesting the integrated content to be output, through the user input interface 880. According to an embodiment, the electronic device 100 may transmit the transmission request signal to the server 900, based on the integrated content output request signal being input.

According to an embodiment, when receiving the transmission request signal from the electronic device 100, the server 900 may generate the integrated content by integrating the first content and the second content, which are individual items of content. According to an embodiment, the server 900 may transmit the integrated content to the electronic device 100.

According to an embodiment, when the electronic device 100 outputs the first content and the second content through separate partial screens and then receives the integrated content from the server 900, the electronic device 100 may output the integrated content through a screen in which a first partial screen and a second partial screen are integrated with each other. For example, when the electronic device 100 outputs two items of content through two partial screens and then receives from the server 900 integrated content in which the two items of content are integrated with each other, the electronic device 100 may output the integrated content through a screen having a size obtained by combining the first partial screen and the second partial screen. According to an embodiment, when the electronic device 100 outputs two items of content through two partial screens and then receives single integrated content in which the two items of content are integrated with each other, the electronic device 100 may increase the size of a screen to a maximum size and output the single integrated content through the screen having the maximum size.

As such, according to an embodiment, the server 900 may convert individual content into integrated content, based on a distance between avatars on a virtual space. A plurality of users may control a plurality of avatars while viewing the avatars together through the integrated content, thereby feeling an immersive experience as if the plurality of users are present together in the same virtual space.

According to an embodiment, the server 900 may transmit the integrated content and when the distance between the first avatar and the second avatar on the virtual space exceeds the threshold, may generate the first content and the second content including the first avatar and the second avatar, respectively, and may transmit the first content and the second content to the electronic device 100.

According to an embodiment, when the electronic device 100 receives the first content and the second content, which are individual items of content, instead of the integrated content from the server 900, the electronic device 100 may output the first content and the second content through separate partial screens, respectively, instead of outputting the integrated content through an integrated screen.

Figure 10:
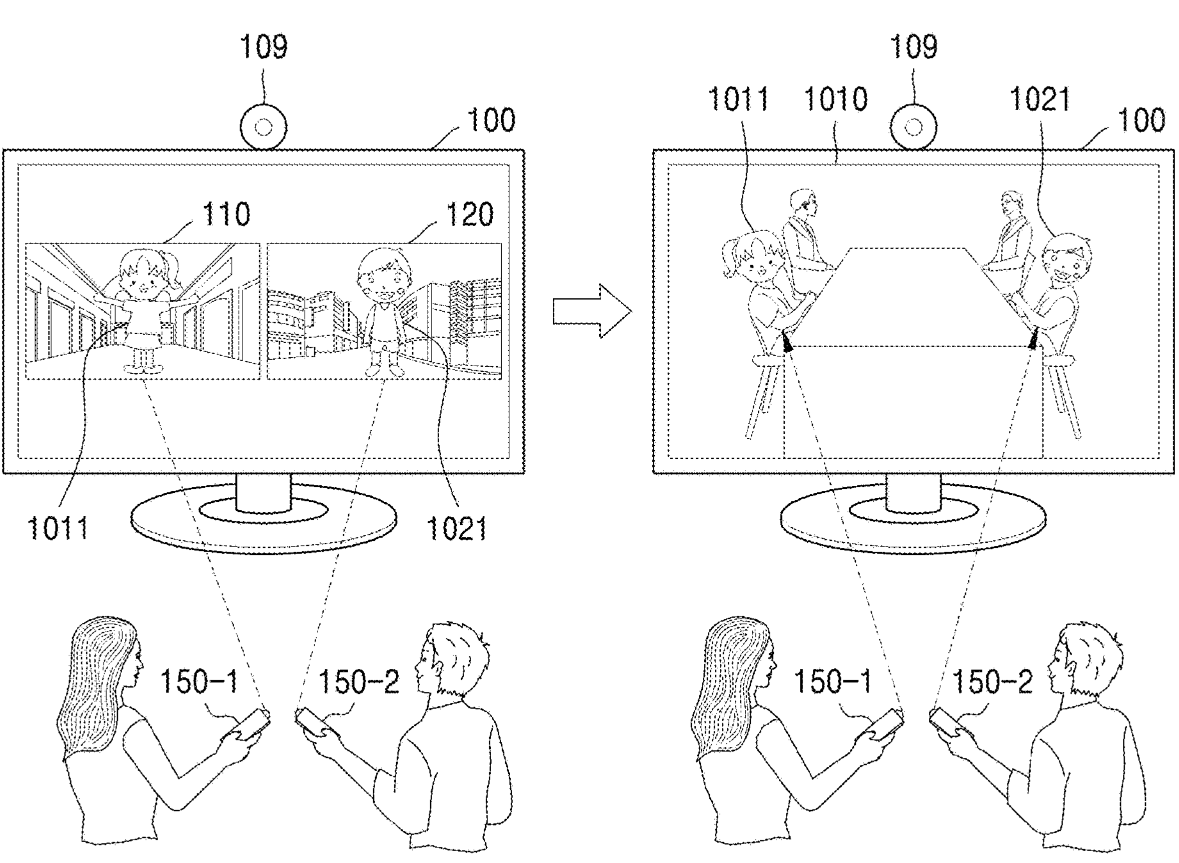
FIG. 10 is a diagram illustrating an electronic device outputting individual items of content and integrated content, according to an embodiment.

FIG. 10 is a diagram illustrating the electronic device 100 outputting individual items of content and integrated content, according to an embodiment.

The left drawing of FIG. 10 illustrates a case where the electronic device 100 outputs two individual items of content controlled by two control devices 150 in a multi-view mode. According to an embodiment, the electronic device 100 may receive the first content and the second content from the server 900, and may output the first content and the second content through the first partial screen 110 and the second partial screen 120, respectively.

According to an embodiment, the first content may include a first avatar 1011, and the second content may include a second avatar 1021.

According to an embodiment, the server 900 may determine whether a distance between the first avatar 1011 and the second avatar 1021 on a virtual space is less than or equal to a threshold. For example, when both the first avatar 1011 and the second avatar 1021 are in the same conference room in the virtual space, the server 900 may determine that the distance between the first avatar 1011 and the second avatar 1021 is less than or equal to the threshold. According to an embodiment, the server 900 may output single integrated content by integrating two individual items of content.

According to an embodiment, the integrated content, which is content including both the first avatar 1011 and the second avatar 1021, may be content in which the first avatar 1011 and the second avatar 1021 are displayed together. According to an embodiment, the integrated content may be content having a view in which a plurality of avatars are observed together from the perspective of a virtual third party.

According to an embodiment, the server 900 may transmit the integrated content to the electronic device 100. According to an embodiment, the electronic device 100 may generate an integrated screen 1010 in correspondence with the reception of the integrated content from the server 900. According to an embodiment, the electronic device 100 may generate the integrated screen 1010 by integrating the first partial screen 110 and the second partial screen 120 respectively outputting the first content and the second content.

According to an embodiment, a size of the integrated screen 1010 may be a size obtained by combining the first partial screen 110 with the second partial screen 120. The size of the integrated screen 1010 may be a size that is greater than the size obtained by combining the first partial screen 110 with the second partial screen 120. For example, as shown on the right side of FIG. 10, when the electronic device 100 outputs only one item of integrated content, the electronic device 100 may increase the size of the integrated screen 1010 to a largest possible size and output the integrated content in a large size through the integrated screen 1010.

This is an example of an embodiment, and the electronic device 100 may generate an integrated screen in various sizes, and may output the integrated content through the integrated screen.

Figure 11:
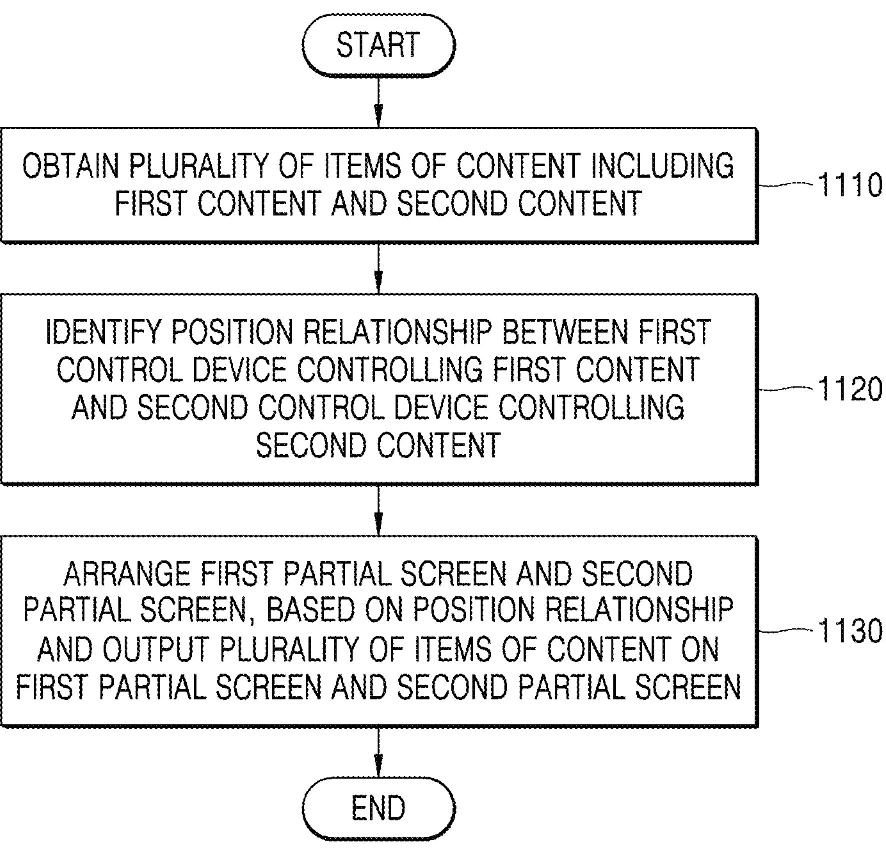
FIG. 11 is a flowchart of an operation method of an electronic device, according to an embodiment.

FIG. 11 is a flowchart of an operation method of the electronic device 100 according to an embodiment.

Referring to FIG. 11, according to an embodiment, the electronic device 100 may obtain a plurality of items of content including the first content and the second content (operation 1110).

According to an embodiment, the electronic device 100 may identify a positional relationship between the first control device 150-1 controlling the first content and the second control device 150-2 controlling the second content (operation 1120).

According to an embodiment, the electronic device 100 may obtain an image by photographing the first control device 150-1 and the second control device 150-2, and may identify the first identification signal output by the first control device 150-1 and the second identification signal output by the second control device 150-2 from the image.

According to an embodiment, the electronic device 100 may identify the positional relationship between the first control device 150-1 and the second control device 150-2, based on the respective locations of the first identification signal and the second identification signal.

According to an embodiment, the electronic device 100 may output the first content through the first partial screen 110, and may output the second content through the second partial screen 120.

According to an embodiment, the electronic device 100 may arrange the first partial screen 110 and the second partial screen 120, based on the positional relationship between the plurality of control devices 150, and may output the plurality of items of content on the first partial screen 110 and the second partial screen 120 (operation 1130).

According to an embodiment, the electronic device 100 may arrange the first partial screen 110 and the second partial screen 120 to correspond to the positional relationship between the plurality of control devices 150, output the first content through the first partial screen 110, and output the second content through the second partial screen 120.

Figure 12:
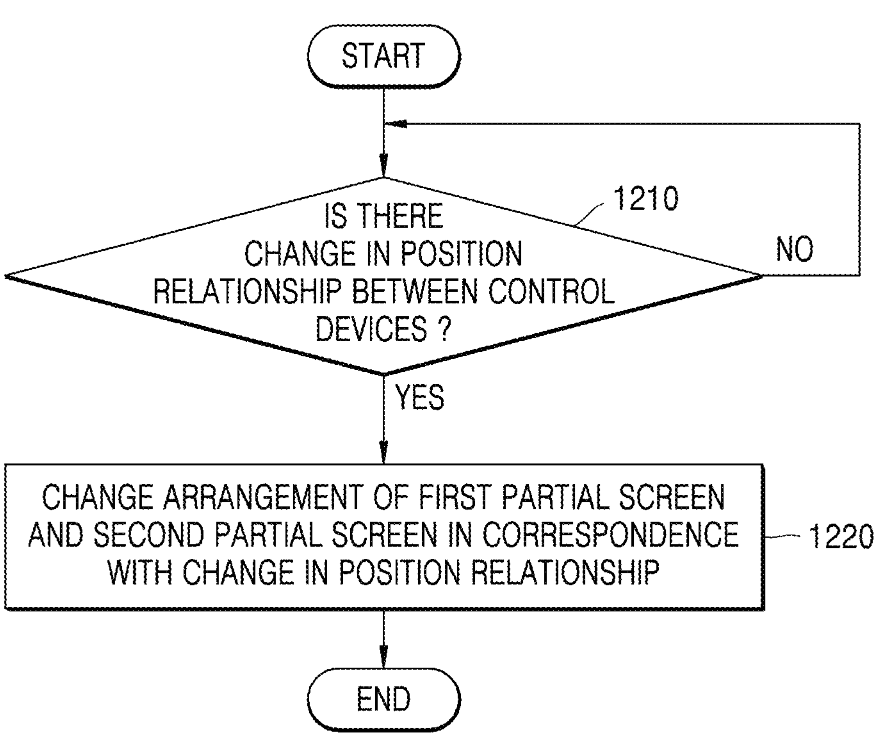
FIG. 12 is a flowchart of an operation method of an electronic device, according to an embodiment.

FIG. 12 is a flowchart of an operation method of the electronic device 100 according to an embodiment.

Referring to FIG. 12, the electronic device 100 according to an embodiment may identify whether there is a change in the positional relationship between the control devices 150 (operation 1210).

According to an embodiment, the electronic device 100 may identify the first identification signal output by the first control device 150-1 and the second identification signal output by the second control device 150-2 from the image obtained by photographing the first control device 150-1 and the second control device 150-2, and may determine whether there is a change in the positional relationship between the first control device 150-1 and the second control device 150-2.

According to an embodiment, when it is determined that there is a change in the positional relationship between the control devices 150, the electronic device 100 may change an arrangement of the first partial screen 110 and the second partial screen 120 in correspondence with the change in the positional relationship between the control devices 150 (operation 1020).

According to an embodiment, the electronic device 100 may output the first content and the second content through the first partial screen 110 and the second partial screen 110 whose arrangements have been changed, respectively.

Figure 13:
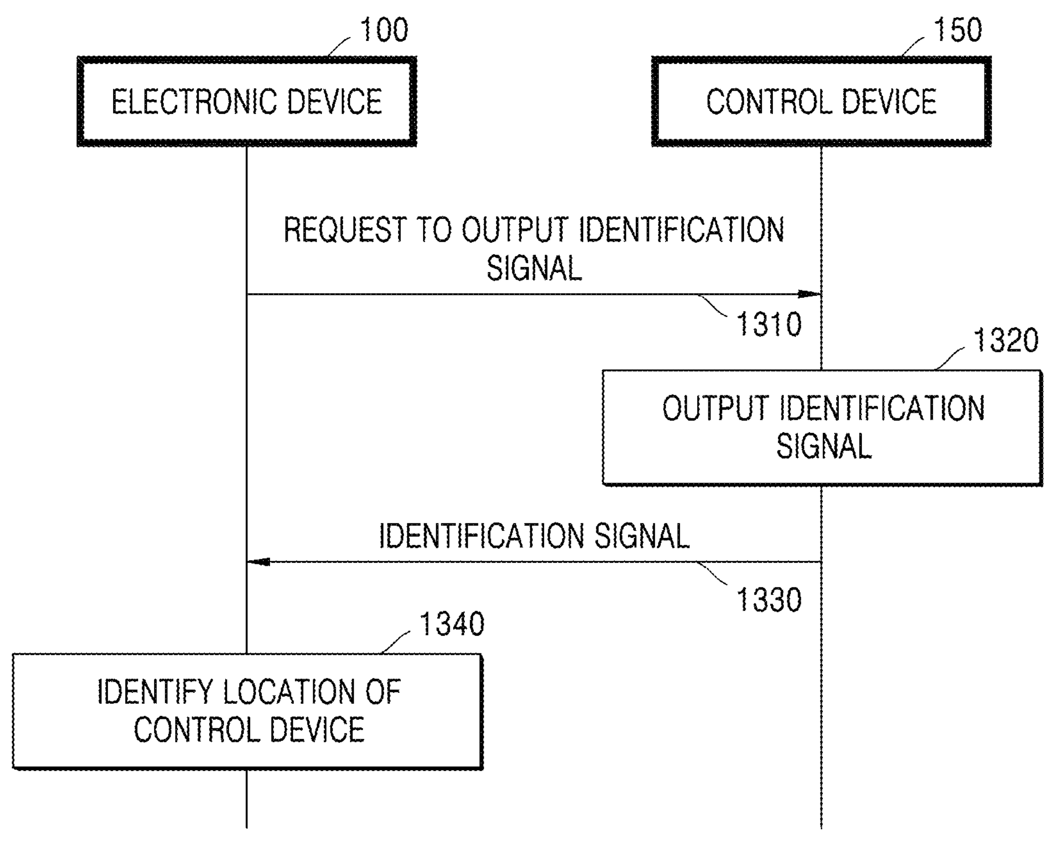
FIG. 13 is a flowchart of a method, performed by an electronic device, of identifying a location of a control device, according to an embodiment.

FIG. 13 is a flowchart of a method, performed by the electronic device 100, of identifying a location of a control device 150, according to an embodiment.

Referring to FIG. 13, the electronic device 100 according to an embodiment may request the control device 150 to output an identification signal (operation 1310).

According to an embodiment, when the electronic device 100 outputs a plurality of items of content controlled by a plurality of control devices 150, the electronic device 100 may request the control device 150 to output an identification signal. For example, the electronic device 100 may transmit an identification signal output request signal to the control device 150. According to an embodiment, the identification signal may be a signal used to identify the control device 150.

According to an embodiment, when the electronic device 100 outputs the plurality of items of content controlled by the plurality of control devices 150, the electronic device 100 may request the control device 150 to output the identification signal only once at the beginning, or at regular intervals, or at random intervals, or whenever an event occurs.

According to an embodiment, the electronic device 100 may request each of the plurality of control devices 150 to output an identification signal. According to an embodiment, the electronic device 100 may request the plurality of control devices 150 to output different identification signals, respectively. According to an embodiment, the different identification signals may be signals that are different from each other in terms of at least one of an LED color and an LED blinking time interval.

According to an embodiment, the control device 150 may receive the identification signal output request signal from the electronic device 100, and thus may output the identification signal (operation 1320).

According to an embodiment, the electronic device 100 may obtain the identification signal that is output by the control device 150 (operation 1330).

According to an embodiment, the electronic device 100 may obtain an image of the control device 150 by using the camera 109, and may identify the identification signal output by the control device 150 from the image. According to an embodiment, when the plurality of control devices 150 transmit different identification signals, respectively, the electronic device 100 may identify the identification signals respectively output by the plurality of control devices 150 from the image of the plurality of control devices 150.

According to an embodiment, the electronic device 100 may identify a location of the control device 150 (operation 1340).

According to an embodiment, the electronic device 100 may identify the location of the control device 150 by using the identification signal transmitted by the control device 150. According to an embodiment, the electronic device 100 may identify the positional relationship between the plurality of control devices 150, based on the identification signals respectively transmitted by the plurality of control devices 150.

Figure 14:
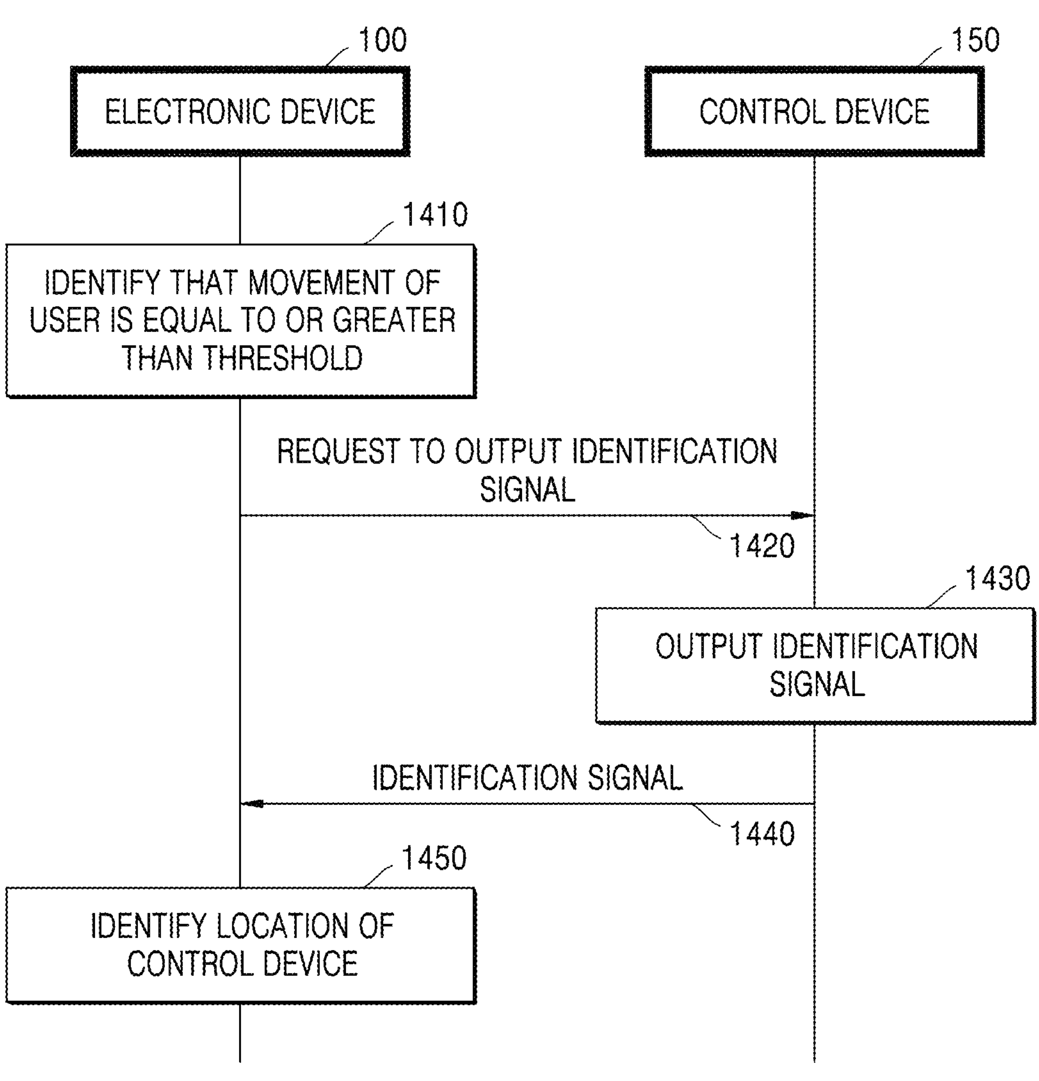
FIG. 14 is a flowchart illustrating a case where an electronic device requests a control device to output an identification signal when an event occurs, according to an embodiment.

FIG. 14 is a flowchart illustrating a case where the electronic device 100 requests the control device 150 to output the identification signal as an event occurs, according to an embodiment.

Referring to FIG. 14, according to an embodiment, the electronic device 100 may sense a movement of a user. According to an embodiment, the electronic device 100 may identify the plurality of users from an image obtained by photographing the plurality of control devices 150 and the plurality of users. According to an embodiment, the electronic device 100 may sense the movement of the user identified from the image.

According to an embodiment, the electronic device 100 may identify that the movement of the user is equal to or greater than a threshold (operation 1410). According to an embodiment, when the electronic device 100 identifies that the movement of the user is equal to or greater than the threshold in left and right directions, the electronic device 100 may sense this identification as occurrence of an event.

According to an embodiment, when the movement of the user is equal to or greater than the threshold, the electronic device 100 may request the control device 150 to output an identification signal (operation 1420).

According to an embodiment, when receiving an identification signal output request from the electronic device 100, the control device 150 may output the identification signal (operation 1430).

According to an embodiment, the electronic device 100 may obtain the identification signal output by the control device 150 (operation 1430), and may identify the location of the control device 150 (operation 1450).

According to an embodiment, when the user moves by a threshold or greater in left and right directions, the electronic device 100 may identify the location of the control device 150 again by allowing the control device 150 to output the identification signal. According to an embodiment, the electronic device 100 may determine whether there is a change in the positional relationship between the plurality of control devices 150 or whether the user does not use the control device 150, based on the identification signal output again by the control device 150.

Figure 15:
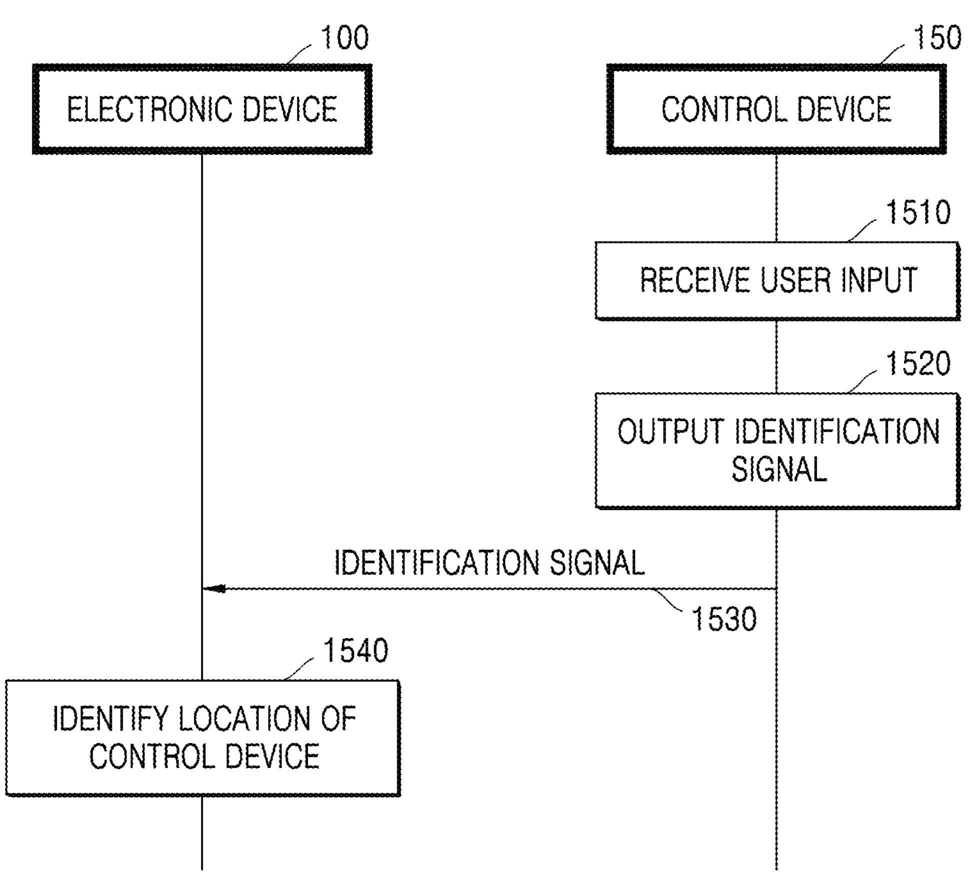
FIG. 15 is a flowchart illustrating a case where an electronic device outputs an identification signal, based on a user input, according to an embodiment.

FIG. 15 is a flowchart illustrating a case where the electronic device 100 outputs an identification signal, based on a user input, according to an embodiment.

According to an embodiment, even when the control device 150 is not requested by the electronic device 100 to output the identification signal, the control device 150 may output the identification signal. For example, the control device 150 may continuously output the identification signal through the LED transmitter. The control device 150 may turn off the LED transmitter when not outputting the identification signal, and then turn on the LED transmitter at regular intervals to cause the LED transmitter to periodically output the identification signal.

The control device 150 may output the identification signal according to a request from the user.

FIG. 15 illustrates a case where the control device 150 outputs the identification signal according to a user's request, according to an embodiment.

Referring to FIG. 15, the control device 150 may receive a user input (operation 1510). According to an embodiment, the control device 150 may receive a user input instructing that the identification signal be output. For example, the user may want to notify an interchange between his or her location and another user's location. For example, to notify that the positional relationship between the control devices 150 has changed, the user may transmit a user input instructing that the identification signal be output, by using the control devices 150.

According to an embodiment, the user may transmit the user input instructing that the identification signal be output, by selecting one from among a plurality of keys included in a control device 150.

According to an embodiment, the control device 150 may output the identification signal in correspondence with the reception of the user input (operation 1520).

According to an embodiment, the electronic device 100 may obtain the identification signal (operation 1530), and may identify the location of the control device (operation 1540).

As such, according to an embodiment, the user may notify the electronic device 100 of a change between respective locations of users by outputting the identification signal through the control device 150, and accordingly change the location of the screen.

Figure 16:
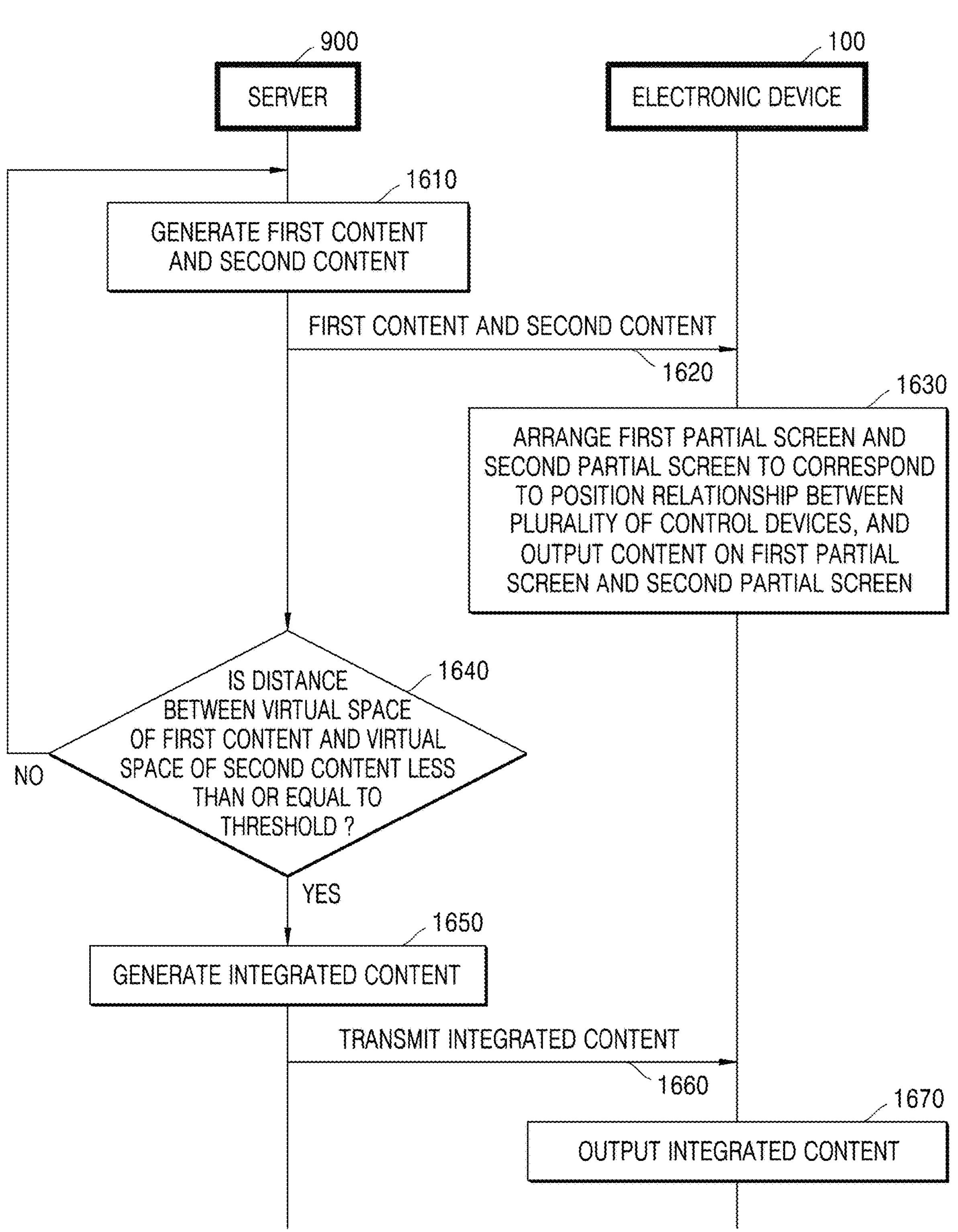
FIG. 16 is a flowchart illustrating an electronic device outputting content received from a server, in various methods, according to an embodiment.

FIG. 16 is a flowchart illustrating the electronic device 100 outputting content received from the server 900, in various methods, according to an embodiment.

According to an embodiment, the server 900 may receive a request for content featuring an avatar from the electronic device 100, and may generate metaverse content for a virtual space in response to the request. According to an embodiment, the server 900 may generate a plurality of individual items of content in correspondence with a request for the plurality of individual items of content respectively featuring a plurality of avatars being received from the electronic device 100. The plurality of individual items of content may be controlled by the plurality of control devices 150, respectively. The plurality of individual items of content may include first content and second content.

Referring to FIG. 16, according to an embodiment, the server 900 may generate the first content and the second content (operation 1610), and may transmit the first content and the second content to electronic device 100 (operation 1620).

According to an embodiment, the electronic device 100 may receive the first content and the second content, which are individual items of content, from the server 900, and may output the first content and the second content through partial screens, respectively.

According to an embodiment, the electronic device 100 may identify the positional relationship between the plurality of control devices 150. According to an embodiment, the electronic device 100 may arrange the first partial screen 110 and the second partial screen 120 to correspond to the positional relationship between the plurality of control devices 150, and may output content on the first partial screen 110 and the second partial screen 120 (operation 1630).

According to an embodiment, the server 900 may determine whether a distance between the virtual space of the first content and the virtual space of the second content is less than or equal to a threshold (operation 1640).

According to an embodiment, the server 900 may determine whether a distance on a virtual space between a first avatar appearing the first content and a second avatar appearing the second content is less than or equal to a threshold.

According to an embodiment, when it is determined that the distance between the virtual space of the first content and the virtual space of the second content is less than or equal to the threshold, the server 900 may generate single integrated content by integrating the first content and the second content (operation 1650).

According to an embodiment, the server 900 may transmit the integrated content to the electronic device 100 (operation 1660).

According to an embodiment, the electronic device 100 may output the integrated content in correspondence with the reception of the integrated content from the server 900 (operation 1670).

According to an embodiment, the electronic device 100 may output the integrated content through a screen in which the first partial screen 110 and the second partial screen 110 are integrated.

According to an embodiment, when individual items of content output by the electronic device 100 are only the first content and the second content, the electronic device 100 may output the integrated content through a screen having a largest possible size, for example, through the entire screen.

According to an embodiment, when the individual items of content output by the electronic device 100 also includes third content, which is another individual item of content, in addition to the first content and the second content, the electronic device 100 may output the integrated content through an integrated screen that integrates the first partial screen 110 and the second partial screen 120, and may also output the third content through the third partial screen 131.

This is an example of an embodiment, and the electronic device 100 may variously change the sizes or locations of partial screens outputting individual items of content, the size or location of an integrated screen outputting integrated content, for example.

Figure 17:
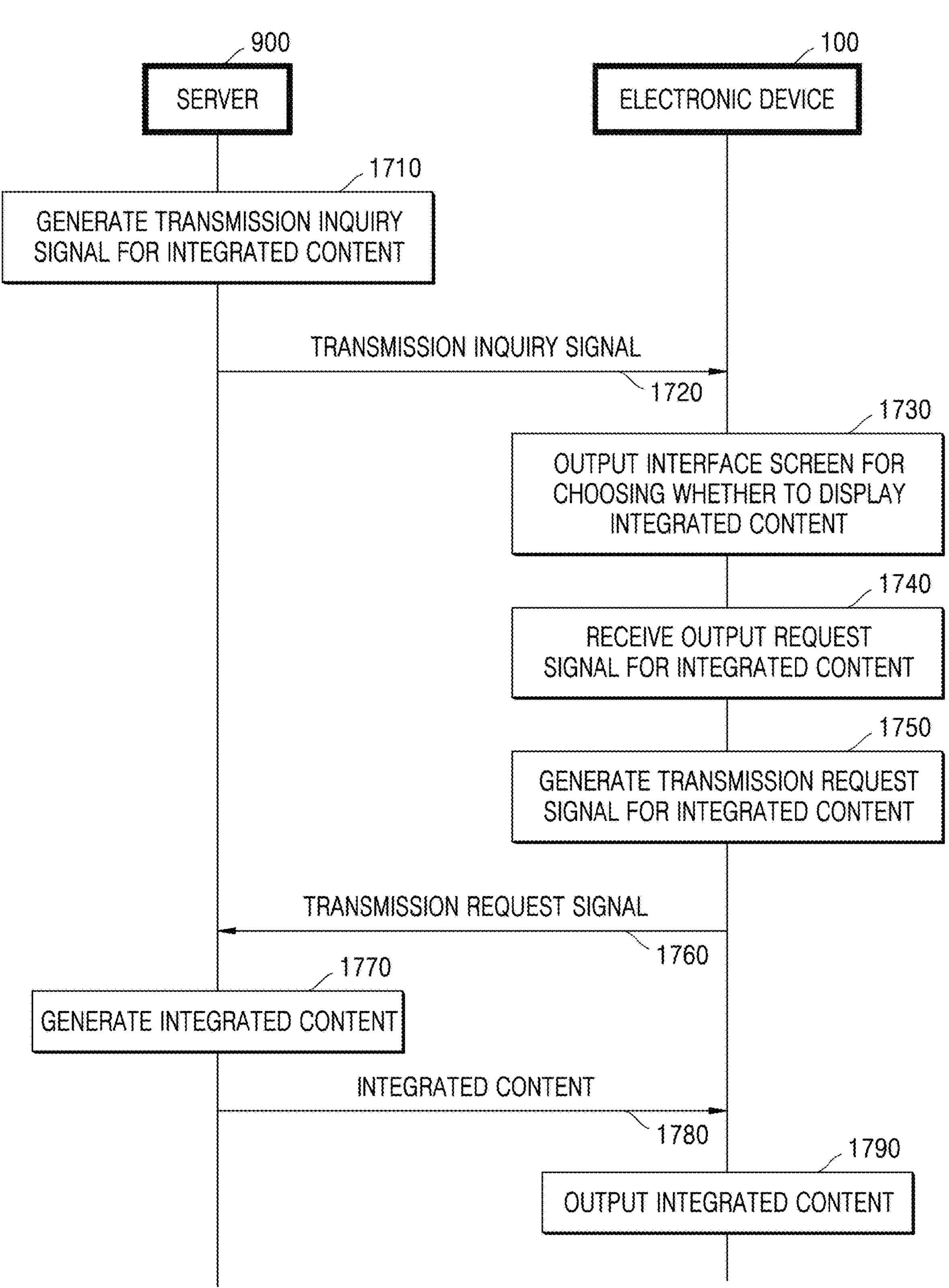
FIG. 17 is a flowchart illustrating an electronic device outputting an interface screen regarding whether to output integrated content, according to an embodiment.

FIG. 17 is a flowchart illustrating the electronic device 100 outputting an interface screen regarding whether to output integrated content, according to an embodiment.

According to an embodiment, a case where the server 900 determines that a distance between the virtual space of the first content and the virtual space of the second content is less than or equal to a threshold is assumed.

According to an embodiment, the server 900 may generate a transmission inquiry signal for integrated content (operation 1710).

According to an embodiment, when it is determined that the distance between the virtual space of the first content and the virtual space of the second content is less than or equal to the threshold, the server 900 may first inquire the electronic device 100 about whether to transmit the integrated content, before generating the integrated content.

According to an embodiment, the server 900 may transmit the transmission inquiry signal (operation 1720).

According to an embodiment, the electronic device 100 may output an interface screen for choosing whether to display the integrated content, in correspondence with the transmission inquiry signal being received from the server 900 (operation 1730).

According to an embodiment, the electronic device 100 may output the interface screen regarding whether to output the integrated content, together with a plurality of items of content. For example, the electronic device 100 may display the interface screen regarding whether to output the integrated content, on a partial area of the screen, by overlaying the interface screen on a plurality of individual items of content.

The interface screen regarding whether to output the integrated content may include text, symbol, or figure asking whether outputting the integrated content is desired. The interface screen regarding whether to output the integrated content may include a button that allows selection of either 'Yes' or 'No'. This is only an example of an embodiment, and the contents of text, or a type, size, output location, transparency, and/or shape of a symbol or figure included in the interface screen regarding whether to output the integrated content may be changed variously.

According to an embodiment, the electronic device 100 may receive the output request signal for integrated content (operation 1740).

The user may input an integrated content output request signal requesting the integrated content to be output, through the user input interface 880. For example, the user may input the integrated content output request signal by viewing the interface screen regarding whether to output the integrated content, through the electronic device 100, and selecting a 'Yes' button included in the interface screen by using the control device 150.

According to an embodiment, when the electronic device 100 receives the integrated content output request signal from the user, the electronic device 100 may generate a transmission request signal for integrated content (operation 1750), and may transmit the transmission request signal to the server 900 (operation 1760).

According to an embodiment, when the server 900 receives the transmission request signal from the electronic device 100, the server 900 may generate the integrated content in response to the identification signal transmission request signal (operation 1770). According to an embodiment, the server 900 may generate integrated content having a third-party' perspective by integrating individual items of content.

According to an embodiment, the server 900 may transmit the integrated content to the electronic device 100 (operation 1780).

According to an embodiment, the electronic device 100 may output the integrated content in correspondence with the reception of the integrated content from the server 900 (operation 1790).

Operation methods of an electronic device, and devices according to some embodiments can be embodied as a storage medium including instruction codes executable by a computer such as a program module executed by the computer. A computer readable medium can be any available medium which can be accessed by the computer and includes all volatile/non-volatile and removable/non-removable media. The computer readable medium may include both a computer storage medium and a communication medium. The computer storage medium includes all volatile/non-volatile and removable/non-removable media embodied by a certain method or technology for storing information such as computer readable instruction code, a data structure, a program module or other data. The communication medium may include the computer readable instruction code, the data structure, the program module, or other data of a modulated data signal, or other transmission mechanism, and includes any information transmission medium.

The electronic device and the operation method thereof, according to the above-described embodiment of the present disclosure, may be implemented as a computer program product including a computer-readable recording medium/storage medium having recorded thereon a program for implementing an operation method of an electronic device, the operation method including an operation of obtaining a plurality of items of content including first content and second content, and an operation of outputting the first content through the first partial screen 110 and outputting the second content through the second partial screen 120, wherein the outputting operation includes an operation of identifying a positional relationship between the first control device 150-1 controlling the first content and the second control device 150-2 controlling the second content, and an operation of arranging the first partial screen 110 and the second partial screen 120 to correspond to the positional relationship and outputting the plurality of items of content on the first partial screen 110 and the second partial screen 120.

The machine-readable storage medium may be provided as a non-transitory storage medium. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

What is claimed is:

1. An electronic device comprising:
a display;
memory storing instructions; and
one or more processors,
wherein the instructions, when executed by the one or more processors, cause the electronic device to:
obtain a plurality of items of content comprising first content and second content;
identify a positional relationship between a first control device controlling the first content and a second control device controlling the second content;
identify degrees of usage of a plurality of control devices comprising the first control device and the second control device, wherein the degrees of usage represent at least one of a usage amount and a usage frequency of each of the plurality of control devices;
arrange a first partial screen comprising the first content and a second partial screen comprising the second content such that the first partial screen and the second partial screen correspond to the positional relationship;
adjust, based on the degrees of usage, at least a size of at least one of the first partial screen and the second partial screen; and
output, via the display, the plurality of items of content on the first partial screen and the second partial screen.

2. The electronic device of claim 1, wherein the instructions, when executed by the one or more processors, cause the electronic device to:
obtain an image of the first control device and the second control device;
identify, from the image, a first identification signal output by the first control device and a second identification signal output by the second control device; and
identify the positional relationship based on the first identification signal and the second identification signal.

3. The electronic device of claim 2, wherein the instructions, when executed by the one or more processors, cause the electronic device to:
transmit, to the first control device, a first output request signal for requesting the first control device to output the first identification signal; and
transmit, to the second control device, a second output request signal for requesting the second control device to output the second identification signal.

4. The electronic device of claim 2, wherein the first identification signal and the second identification signal are different from each other in terms of at least one of an LED color and an LED blinking time interval.

5. The electronic device of claim 2, wherein the instructions, when executed by the one or more processors, cause the electronic device to identify the degrees of usage based on at least one of:
a plurality of frequencies at which control signals for content control are input from the plurality of control devices,
a plurality of sensing signals for control device movement received from the plurality of control devices,
a change degree of at least one of an avatar and a background included in content, and
a distance between a user and a control device, wherein the distance is detected from the image.

6. The electronic device of claim 1, wherein the instructions, when executed by the one or more processors, cause the electronic device to:
identify a change in the positional relationship between the first control device and the second control device; and
re-arrange the first partial screen and the second partial screen to correspond to the changed positional relationship, and display the plurality of items of content on the re-arranged first partial screen and the re-arranged second partial screen.

7. The electronic device of claim 1, further comprising a communication interface,
wherein the instructions, when executed by the one or more processors, cause the electronic device to:
receive the plurality of items of content from a server via the communication interface; and
based on receiving, from the server, single integrated content in which the first content and the second content are integrated, output, via the display, one screen comprising the integrated content.

8. The electronic device of claim 7, wherein the instructions, when executed by the one or more processors, cause the electronic device to:
receive a transmission inquiry signal from the server for the integrated content;
based on receiving the transmission inquiry signal, output, via the display, an interface screen for choosing whether to display the integrated content; and
transmit a transmission request signal to the server, based on receiving a third output request signal corresponding to a selection from the interface screen.

9. A server for providing content to an electronic device, the server comprising:
a communication interface;
memory storing instructions; and
one or more processors,
wherein the instructions, when executed by the one or more processors, cause the server to:
transmit a plurality of items of content comprising first content and second content, to the electronic device, via the communication interface;
based on a distance between a virtual space of the first content and a virtual space of the second content being less than or equal to a threshold, generate integrated content, the integrated content comprising the first content and the second content, and transmit the integrated content to the electronic device via the communication interface; and based on the distance between the virtual space of the first content and the virtual space of the second content being greater than the threshold, transmit the first content and the second content to the electronic device via the communication interface, wherein the first content is transmitted separately from the second content.

10. An operation method of an electronic device, the operation method comprising:

obtaining a plurality of items of content comprising first content and second content;

identifying a positional relationship between a first control device controlling the first content and a second control device controlling the second content;

identifying degrees of usage of a plurality of control devices comprising the first control device and the second control device, wherein the degrees of usage represent at least one of a usage amount and a usage frequency of each of the plurality of control devices;

arranging a first partial screen comprising the first content and a second partial screen comprising the second content such that the first partial screen and the second partial screen correspond to the positional relationship;

adjusting, based on the degrees of usage, at least a size of at least one of the first partial screen and the second partial screen; and outputting, via a display, the plurality of items of content on the first partial screen and the second partial screen.

11. The operation method of claim 10, wherein the identifying the positional relationship comprises:

obtaining an image of the first control device and the second control device;

identifying, from the image, a first identification signal output by the first control device and a second identification signal output by the second control device; and identifying the positional relationship based on the first identification signal and the second identification signal.

12. The operation method of claim 11, further comprising:

transmitting, to the first control device, a first output request signal for requesting to output a first identification signal; and transmitting, to the second control device, a second output request signal for requesting to output the second identification signal.

13. The operation method of claim 11, wherein the first identification signal and the second identification signal are different from each other in terms of at least one of an LED color and an LED blinking time interval.

14. The operation method of claim 11, further comprising:

identifying a change in the positional relationship between the first control device and the second control device; and re-arranging the first partial screen and the second partial screen to correspond to the changed positional relationship, and displaying the plurality of items of content on the re-arranged first partial screen and the re-arranged second partial screen.

15. The operation method of claim 11, wherein the identifying the degrees of usage of the plurality of control devices comprises:

identifying the degrees of usage based on at least one of:

a plurality of frequencies at which control signals for content control are input from the plurality of control devices, a plurality of sensing signals for control device movement received from the plurality of control devices, a change degree of at least one of an avatar and a background included in content, and a distance between a user and a control device, wherein the distance is detected from the image.

16. The operation method of claim 10, wherein the obtaining the plurality of items of content comprises receiving the plurality of items of content from a server, the method further comprising:

based on receiving, from the server, single integrated content in which the first content and the second content are integrated, outputting, via the display, one screen comprising the integrated content.

17. The operation method of claim 16, further comprising:

receiving a transmission inquiry signal from the server for the integrated content;

based on receiving the transmission inquiry signal, outputting, via the display, an interface screen for choosing whether to display the integrated content; and transmitting a transmission request signal to the server, based on receiving a third output request signal corresponding to a selection from the interface screen.

18. A non-transitory computer-readable recording medium having recorded thereon a program for implementing an operation method of an electronic device, the operation method comprising:

obtaining a plurality of items of content comprising first content and second content;

identifying a positional relationship between a first control device controlling the first content and a second control device controlling the second content;

identify degrees of usage of a plurality of control devices comprising the first control device and the second control device, wherein the degrees of usage represent at least one of a usage amount and a usage frequency of each of the plurality of control devices;

arranging a first partial screen comprising the first content and a second partial screen comprising the second content such that the first partial screen and the second partial screen correspond to the positional relationship;

adjust, based on the degrees of usage, at least a size of at least one of the first partial screen and the second partial screen; and output, via a display, the plurality of items of content on the first partial screen and the second partial screen.

* * * * *